US012299962B2

(12) United States Patent
Kreis et al.

(10) Patent No.: US 12,299,962 B2
(45) Date of Patent: May 13, 2025

(54) DIFFUSION-BASED GENERATIVE MODELING FOR SYNTHETIC DATA GENERATION SYSTEMS AND APPLICATIONS

(71) Applicant: Nvidia Corporation, Santa Clara, CA (US)

(72) Inventors: Karsten Kreis, Vancouver (CA); Tim Dockhorn, Waterloo (CA); Arash Vahdat, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 339 days.

(21) Appl. No.: 17/959,915

(22) Filed: Oct. 4, 2022

(65) Prior Publication Data

US 2023/0109379 A1    Apr. 6, 2023

Related U.S. Application Data

(60) Provisional application No. 63/252,301, filed on Oct. 5, 2021.

(51) Int. Cl.
*G06V 10/774* (2022.01)
*G06N 3/045* (2023.01)
(Continued)

(52) U.S. Cl.
CPC ............ *G06V 10/774* (2022.01); *G06N 3/045* (2023.01); *G06N 3/047* (2023.01); *G06T 7/277* (2017.01);
(Continued)

(58) Field of Classification Search
CPC ....... G06N 3/045; G06N 3/047; G06N 3/0475; G06N 3/09; G06N 3/096;
(Continued)

(56) References Cited

U.S. PATENT DOCUMENTS

| | | | | |
|---|---|---|---|---|
| 7,127,127 B2* | 10/2006 | Jojic | ...................... | G11B 27/28 |
| | | | | 707/E17.024 |
| 11,347,973 B2* | 5/2022 | Rhee | ...................... | G06N 3/088 |

(Continued)

OTHER PUBLICATIONS

Dietmar Uttenweiler et al., "Spatiotemporal anisotropic diffusion filtering to improve signal-to-noise ratios and object restoration in fluorescence microscopic image sequences," Sep. 12, 2002, Journal of Biomedical Optics 8(1), 40-47 (Jan. 2003), pp. 40-46.*

(Continued)

*Primary Examiner* — Omar S Ismail
(74) *Attorney, Agent, or Firm* — Hogan Lovells US LLP

(57) ABSTRACT

Systems and methods described relate to the synthesis of content using generative models. In at least one embodiment, a score-based generative model can use a stochastic differential equation with critically-damped Langevin diffusion to learn to synthesize content. During a forward diffusion process, noise can be introduced into a set of auxiliary (e.g., "velocity") values for an input image to learn a score function. This score function can be used with the stochastic differential equation during a reverse diffusion denoising process to remove noise from the image to generate a reconstructed version of the input image. A score matching objective for the critically-damped Langevin diffusion process can require only the conditional distribution learned from the velocity data. A stochastic differential equation based integrator can then allow for efficient sampling from these critically-damped Langevin diffusion models.

20 Claims, 17 Drawing Sheets

(51) Int. Cl.
*G06N 3/047* (2023.01)
*G06T 7/277* (2017.01)

(52) U.S. Cl.
CPC .............. *G06T 2207/20081* (2013.01); *G06T 2207/20084* (2013.01)

(58) Field of Classification Search
CPC . G06T 2207/20081; G06T 2207/20084; G06T 5/60; G06T 5/70; G06T 7/277; G06V 10/772; G06V 10/774; G06V 10/82
See application file for complete search history.

(56) References Cited

U.S. PATENT DOCUMENTS

| | | | |
|---|---|---|---|
| 2017/0372155 A1* | 12/2017 | Odry | G06F 18/28 |
| 2017/0372193 A1* | 12/2017 | Mailhe | G06T 5/77 |
| 2020/0020098 A1* | 1/2020 | Odry | G06T 7/0012 |
| 2020/0065626 A1* | 2/2020 | Kaufhold | G06V 10/82 |
| 2020/0234402 A1* | 7/2020 | Schwartz | G06T 5/70 |
| 2020/0273167 A1* | 8/2020 | Wilson | G06V 10/82 |
| 2021/0073959 A1* | 3/2021 | Elmalem | G06N 3/084 |
| 2021/0360199 A1* | 11/2021 | Oz | H04N 7/147 |
| 2021/0392296 A1* | 12/2021 | Rabinovich | G06T 15/20 |
| 2022/0051412 A1* | 2/2022 | Gronau | G06V 40/172 |
| 2022/0107378 A1* | 4/2022 | Dey | G06N 3/08 |
| 2022/0189133 A1* | 6/2022 | Fuchs | G06V 20/695 |
| 2022/0198612 A1* | 6/2022 | Weinmann | G06T 5/50 |
| 2022/0215510 A1* | 7/2022 | Weinmann | G06T 5/70 |
| 2022/0222781 A1* | 7/2022 | Jacob | G06N 3/084 |
| 2023/0067841 A1* | 3/2023 | Saharia | G06N 3/047 |

OTHER PUBLICATIONS

Yueqin Yin et al.,"DiffGAR: Model-Agnostic Restoration from Generative Artifacts Using Image-to-Image Diffusion Models," Mar. 30, 2023 ,CSAI '22: Proceedings of the 2022 6th International Conference on Computer Science and Artificial Intelligence,pp. 55-60.*

Jonathan Ho et al.,"Denoising Diffusion Probabilistic Models," Dec. 16, 2020, 34th Conference on Neural Information Processing Systems (NeurIPS 2020), Vancouver, Canada, pp. 1-8.*

V B Surya Prasath et al.,"Analysis of adaptive forward-backward diffusion flows with applications in image processing," Sep. 24, 2015,Inverse Problems 31,pp. 6-25.*

Siwei Yu et al.,"Deep learning for denoising," Oct. 9, 2019, Geophysics, vol. 84, No. 6 (Nov.-Dec. 2019), pp. V333-V342.*

Kevin De Haan et al.,"Deep-Learning-Based Image Reconstruction and Enhancement in Optical Microscopy," Dec. 26, 2019, Proceedings of the IEEE | vol. 108, No. 1, Jan. 2020,pp. 30-46.*

* cited by examiner

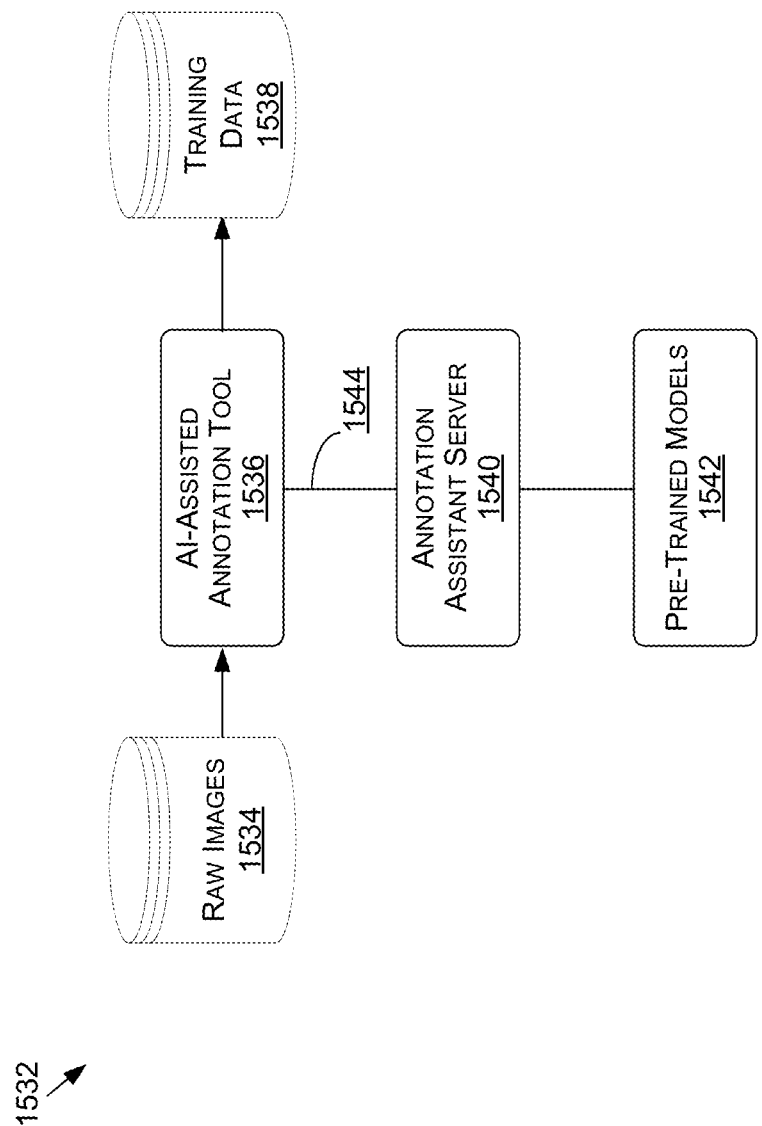

DIFFUSION-BASED GENERATIVE MODELING FOR SYNTHETIC DATA GENERATION SYSTEMS AND APPLICATIONS

CROSS-REFERENCE TO RELATED APPLICATIONS

This application claims priority to U.S. Provisional Patent Application Ser. No. 63/252,301, entitled "Score-Based Generative Modeling," filed Oct. 5, 2021, which is hereby incorporated herein in its entirety and for all purposes.

BACKGROUND

Generative modeling is an important area of deep learning, with applications in areas such as image and audio synthesis, three-dimensional (3D) shape generation (and content generation more generally), super-resolution, image-to-image translation, and image editing. One of the most popular classes of generative models includes generative adversarial networks (GANs), which can generate high quality image or video content. GANs can be difficult to train, however, due at least in part to their adversarial objective, and often do not faithfully model all parts of a data distribution, potentially failing to include relevant parts (e.g., example minorities) of a data distribution of interest. To avoid at least some of these issues with using GANs for content generation, models such as score-based generative models (SGMs) are increasingly being used that may provide higher synthesis quality than can be achieved with GANs, with significantly better data distribution coverage. SGMs can also be easier to train in many instances. A significant drawback in using SGMs, however, is that they often have a relatively low sampling rate, due at least in part to the iterative nature of the denoising process of an SGM. Various attempts have been made to improve the synthesis speed of SGMs by accelerating the rate of sampling, but these approaches achieve acceleration through comprises in data distribution coverage, which was one of the primary advantages in using an SGM instead of a GAN in the first place.

BRIEF DESCRIPTION OF THE DRAWINGS

Various embodiments in accordance with the present disclosure will be described with reference to the drawings, in which:

FIGS. 15A and 15B illustrate a data flow diagram for a process to train a machine learning model, as well as client-server architecture to enhance annotation tools with pre-trained annotation models, in accordance with at least one embodiment.

DETAILED DESCRIPTION

Figure 1A:
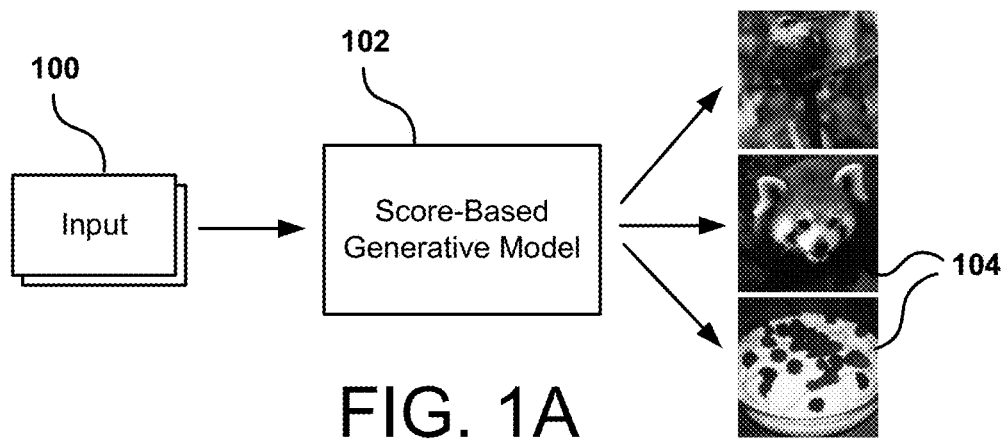
FIGS. 1A, 1, and 1C illustrate use of a score-based generative model to generate image content, including a diffusion and denoising of data used to train the model, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Approaches in accordance with various illustrative embodiments provide a neural network-optimized framework for training deep generative models. In particular, embodiments of the present systems and methods improve score function and "denoise" diffusion-based models, such as score-based generative models (SGMs) or neural networks, in terms of aspects such as synthesis quality, synthesis speed, and reconstruction of objects, such as for video streaming operations. Generative models such as SGMs have demonstrated high quality image synthesis capabilities. Various SGMs utilize a diffusion process that gradually perturbs the data towards a tractable distribution, while the generative model learns to denoise an input. The complexity of this denoising task is, apart from the data distribution itself, uniquely determined by the diffusion process. Prior work with SGMs employed overly simplistic diffusions, leading to unnecessarily complex denoising processes that limit generative modeling performance. In at least one embodiment, a critically-damped Langevin diffusion (CLD) can be used with an SGM, which can achieve superior performance over prior generative approaches. Such an approach can involve running a joint diffusion in an extended space, such as a data-velocity space. In such a space, such auxiliary variables can be considered "velocities," or derivatives of the input data variable values (e.g., pixel values), that are coupled to the data variables as in Hamiltonian dynamics. A score matching objective for CLD can be derived, and it can be demonstrated that such a model only needs to learn the score function of the conditional distribution of the velocity given data, an easier task than learning scores of the data directly. In at least one embodiment, a sampling scheme for efficient synthesis can be used that is derived from CLD-based diffusion models. CLD-based approaches can outperform prior SGM-based approaches in synthesis quality for similar network architectures and sampling compute budgets. Such CLD-based approaches can also significantly outperform solvers such as Euler-Maruyama. A framework for such an approach can provide insight into score-based denoising diffusion models and can be readily used for high-resolution image synthesis for a variety of different applications or operations.

Such a generative model, once trained, can advantageously generate content for a variety of different applications and use cases. These can include, by way of example and without limitation, use in conversational systems to provide a view of a participant to a conversation. This would apply broadly to any situation where a computer system is interacting with a human via verbal or written communication. Such approaches can also be used to generate novel content for applications such as gaming, animation, special effects, or virtual/mixed/enhanced reality experiences. Such approaches can also be beneficial when generating environments, 3D object representations, or characters for applications or services having a visual aspect or component. Generative models can be used to synthesize other types of content as well, as may relate to speech or music. Generative models can be used as parts of systems to perform more complex tasks as well, as may relate to upsampling or super-resolution, image to image resolution, or 3D/4D complex animation or shape generation.

Variations of this and other such functionality can be used as well within the scope of the various embodiments as would be apparent to one of ordinary skill in the art in light of the teachings and suggestions contained herein.

FIG. 1A illustrates an example system that can be used to generate instances of content in accordance with various embodiments. In this example, a score-based generative model (SGM) 102 is used to generate instances of content 104, in this case images of objects of one or more classes for which the model was trained. For each instance of content 104 to be generated, at least one respective input 100 can be provided. This can include, for example, one or more reference images, style inputs, or pose inputs to use to guide the content generation. In other embodiments, this may include a random value, random noise, a value sampled from a distribution, or a latent vector that can be used by the SGM to generate a respective instance of content. For example, features extracted from a set of training data can be used to generate a latent feature space, or learn a data value distribution, and content can be generated by sampling from this latent space or distribution and providing that sample data as input to the SGM 102.

An SGM 102 or denoising diffusion probabilistic model can be used for a variety of generative and synthesis operations, offering high quality synthesis and sample diversity without a need for adversarial objectives. SGMs use a diffusion process to gradually or iteratively add noise to input data, transforming a complex data distribution to an analytically tractable prior distribution. A neural network can be utilized to learn the score function—such as, in example non-limiting embodiments, the gradient of the log probability density—of the perturbed data. These learnt scores can be used to solve a stochastic differential equation (SDE) to synthesize one or more new samples. This corresponds to an iterative denoising process, effectively inverting the forward diffusion process. It has been demonstrated that a score function to be learnt by a neural network is uniquely determined by a forward diffusion process. Consequently, the complexity of the learning problem can depend primarily, or even only, on the diffusion. Approaches in accordance with various embodiments can treat this diffusion process as a key component of SGMs to further improve SGMs in terms of, for example, synthesis quality or sampling speed.

Figure 1B:
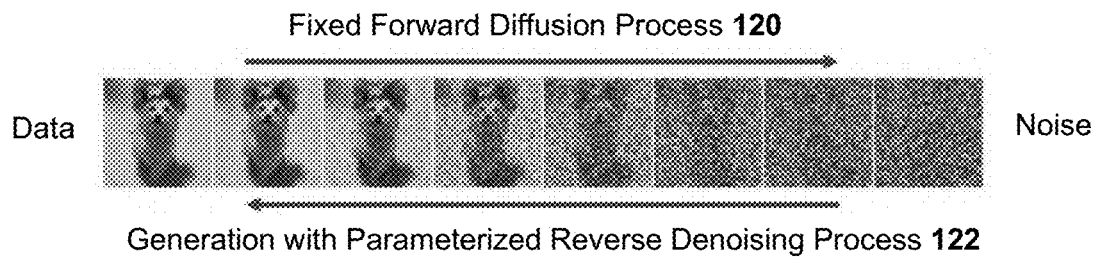
Figure 1C:
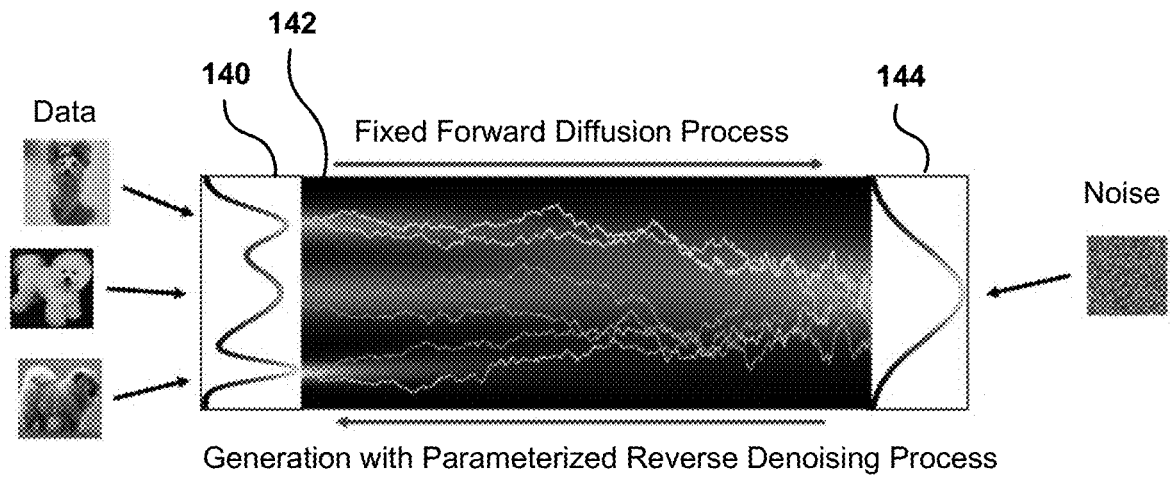

An SGM can leverage a diffusion process such as that illustrated in FIG. 1B. In such a process, image data (e.g., RBG pixel data) is provided as input to the diffusion process. During this process, noise is gradually added (e.g., over a number of iterations) during a fixed forward diffusion process 120. This noise can be added iteratively, in similar or different amounts, until a final image is produced during this forward pass 120 that represents only noise, or that otherwise lacks features corresponding to an object in an original input image. A backward pass can take this noise image and attempt to gradually remove noise (e.g., over another number of iterations) until the original image data is successfully reconstructed. This can involve a generation pass with parameterized reverse denoising 122. An SGM can thus transform an empirically-defined data distribution 140 to an analytically-tractable Normal prior distribution 144 as illustrated in FIG. 1C, where different amounts of noise added to, and removed from, an image during a diffusion and denoising process are illustrated by a combined plot 142 in a data-velocity space.

Systems and methods disclosed herein can employ a diffusion that perturbs the data in a smooth manner, which can simplify denoising with respect to other approaches. Such an approach can help to reduce the complexity of a learning task, making it more efficient to train a model to produce high synthesis quality. Further, since the data is perturbed in a smooth manner and denoising becomes easier, fewer iterations (e.g., neural network calls) are required when synthesizing novel data from the model. Such approaches can thus improve both the synthesis quality and sampling speed of SGMs.

Figure 2:
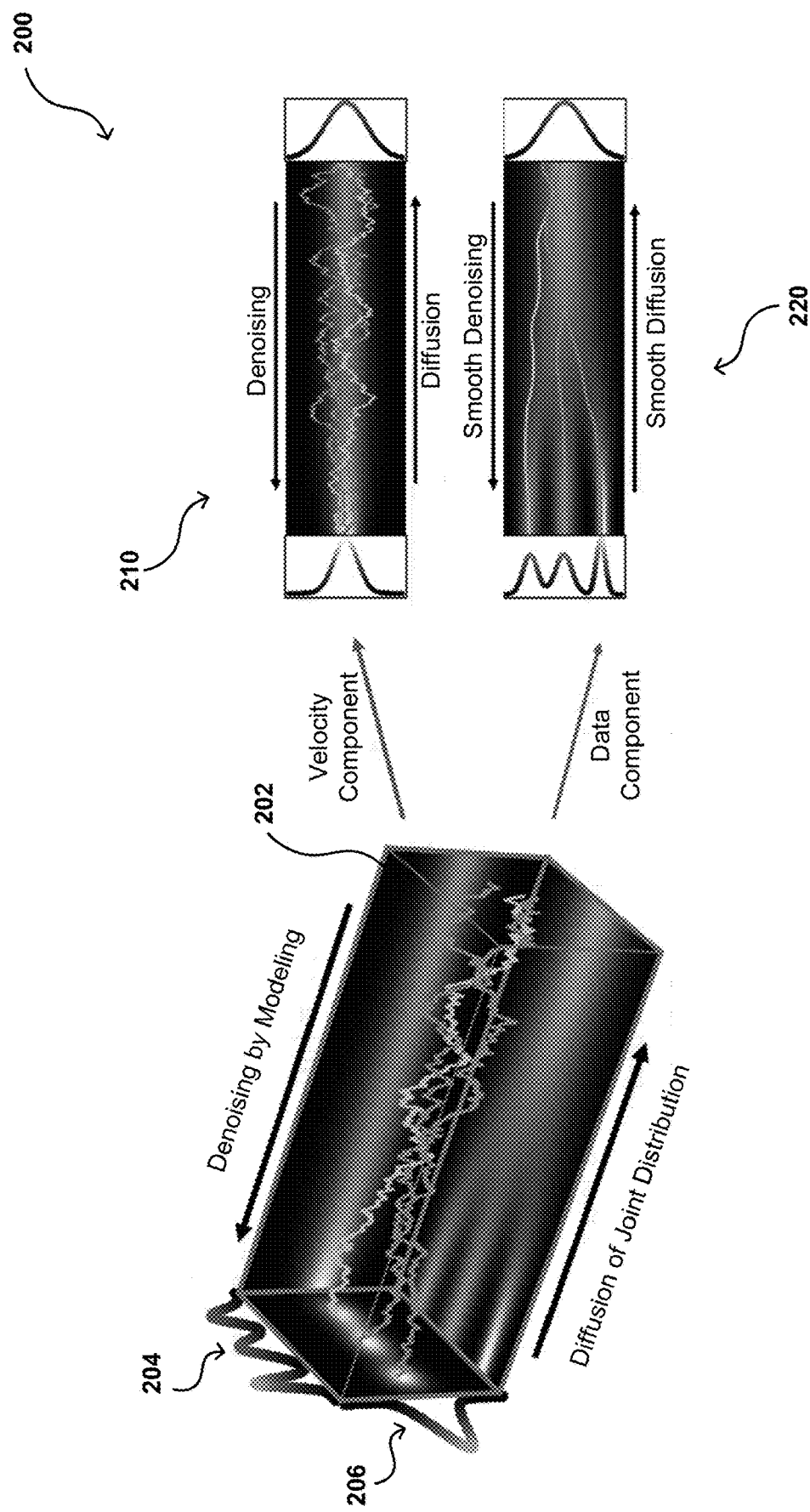
FIG. 2 illustrates introduction of noise into a velocity component in data-velocity space for an image, with coupled data and velocity components, in accordance with various embodiments.

Operations in accordance with various embodiments can utilize a diffusion process that is referred to herein as critically-damped Langevin diffusion ("CLD"). In CLD, the data variables are augmented with additional auxiliary variables, referred to herein as "velocity" variables due to their derivative nature, and a diffusion process is run in a joint data-velocity space 202, as illustrated in FIG. 2. Data and velocity are coupled to each other, as in Hamiltonian dynamics, and noise is injected only into the velocity variable, and not into the data itself. This is in contrast to previous efforts that inject noise directly into the data variables. For such a CLD-based implementation, the Hamiltonian component can assist in efficiently traversing the joint data-velocity space 202 and transforming the data distribution into the prior distribution more smoothly. A specific score matching objective can be used for training SGMs with CLD. For CLD, the neural network can be tasked with learning only the score of the conditional distribution of velocity given data, which can be more straightforward than learning the score of diffused data distribution directly. This differs from prior approaches that directly modeled the score of the data distribution.

One or more embodiments may also include the use of a stochastic differential equation ("SDE") integrator that is tailored to CLD. Such an integrator can be selected or derived based, at least in part, on an SDE for sampling from a CLD-based SGM consisting of one or more of: a Hamiltonian component, an Ornstein-Uhlenbeck process, or a neural network term. The first two components can be solved analytically. Further, a hybrid type of denoising score matching can be used that is well suited for scalable training of CLD-based SGMs. Such a score matching method can be tailored to CLD-based models.

As illustrated in FIG. 2, a forward diffusion process such as critically-damped Langevin diffusion (CLD) can be used, in which a data variable $x_t$ (time t along the diffusion) is augmented with an additional velocity variable $v_t$. A diffusion process can then be performed in a joint data-velocity space 202. Data and velocity can be coupled to each other as in Hamiltonian dynamics, and noise can be injected only into the velocity variable 210. Such an approach can lead to smooth trajectories 220 for the data variable or component, which is coupled to the velocity variable to which noise is introduced. A Hamiltonian component can help to efficiently traverse the joint data-velocity space, as well as to transform the data distribution into the prior distribution more smoothly. A corresponding score matching objective can be used, and it can be demonstrated that for CLD the neural network is tasked with learning only the score of the conditional distribution of velocity given data:

$$\nabla_{v_t} \log p(v_t, x_t)$$

which may be easier than learning the score of diffused data distribution directly, in at least some situations. An SDE integrator can also be used that is tailored to CLD's reverse-time synthesis SDE.

A diffusion process $U_t \in \mathbb{R}^d$ can be defined by:

$$du_t = f(u_t, t)dt + G(u_t, t)dw_t$$

$$t \in [0, T]$$

with continuous time variable $t \in [0, T]$, standard Wiener process $w_t$, drift coefficient f: $\mathbb{R}^d \times [0, T] \to \mathbb{R}^d$ and diffusion coefficient G: $\mathbb{R}^d \times [0, T] \to \mathbb{R}^{d \times d}$. Defining $\bar{u}_T := U_{T-t}$, a corresponding reverse-time diffusion process that inverts the above forward diffusion can be derived with positive $d_t$ and $t \in [0, T]$, as may be given by:

$$d\bar{u}_t = [-f(\bar{u}_t, T-t) + G(\bar{u}_t, T-t)G(\bar{u}_t, T-t)^T \nabla_{\bar{u}_t} \log p_{T-t}(\bar{u}t)]dt + G(\bar{u}_t, T-t)dw_t$$

where $\nabla_{\bar{u}_t} \log P_{T-t}(\bar{u}_t)$ is the score function of the marginal distribution over $\bar{u}_t$ at time T−t.

In at least one embodiment, a reverse-time process can be used as a generative model, such as where data x can be modeled, setting $p(u_0) = p_{data}(x)$. Prior SDEs had drift and diffusion coefficients of a simple form, such as $f(x_t, t) = f(t)x_t$ and $G(x_t, t) = g(t)I_d$. Values for f and G can be chosen such that the SDE's marginal, equilibrium density is approximately Normal at time T, i.e., $p(u_T) \approx N(0, I_d)$. Value $x_0$ can then be initialized based on a sample drawn from a complex data distribution, corresponding to a far-from-equilibrium state. While state $x_0$ can be allowed to relax towards equilibrium via the forward diffusion, a model $s_\theta(x_t, t)$ can be learned for the score $\nabla_{x_t} \log p_t(x_t)$, which can be used for synthesis via the reverse-time SDE in the above equation. If f and G take the simple form from above, the denoising score matching objective for this task can be given by:

$$\min_\theta E_{t \sim [0,T]} E_{x_0 \sim p(x_0)} E_{x_t \sim p_t(x_t|x_0)} [\lambda(t) \| s_\theta(x_t, t) - \nabla_{x_t} \log p_t(x_t|x_0) \|_2^2]$$

If f and G are affine, the conditional distribution $p_t(x_t|x_0)$ is Normal and available analytically. Different values for $\lambda(t)$ result in different trade-offs between synthesis quality and likelihood in the generative model defined by $s_\theta(x_t, t)$.

The data $x_t \in \mathbb{R}^d$ can be augmented with auxiliary velocity variables $v_t \in \mathbb{R}^d$ and a diffusion process used that can be performed in a joint $x_t$-$v_t$ space. With $u_t = (x_t, v_t)^T \in \mathbb{R}^{2d}$ such a process can set as follows:

$$f(u_t, t) := \begin{pmatrix} 0 & \beta M^{-1} \\ -\beta & -\Gamma \beta M^{-1} \end{pmatrix} \otimes I_d u_t$$

$$G(u_t, t) := \begin{pmatrix} 0 & 0 \\ 0 & \sqrt{2\Gamma\beta} \end{pmatrix} \otimes I_d$$

where $\otimes$ denotes the Kronecker product. A coupled SDE that describes the diffusion process can then be given by:

$$\begin{pmatrix} dx_t \\ dv_t \end{pmatrix} = \begin{pmatrix} M^{-1} v_t \\ -x_t \end{pmatrix} \beta dt + \begin{pmatrix} 0 \\ -\Gamma M^{-1} v_t \end{pmatrix} \beta dt + \begin{pmatrix} 0 \\ \sqrt{2\Gamma\beta} \end{pmatrix} dw_t$$

where this first term corresponds to the Hamiltonian component, and the second and third terms together correspond to the Ornstein-Uhlenbeck process, and the equation itself corresponds to Langevin dynamics in each dimension. In such an embodiment, each $x_t$ can be independently coupled to a velocity $v_t$, which explains the block-wise structure of f and G. The mass $M \in \mathbb{R}^+$ is a hyperparameter that determines the coupling between the $x_t$ and $v_t$ variables; $\beta \in \mathbb{R}^+$ is a constant time rescaling chosen such that the diffusion converges to its equilibrium distribution within $t \in [0,T]$, such as for T=1, when initialized from a data-defined non-equilibrium state, and is analogous to $\beta(t)$ in previous diffusions; $\Gamma \in \mathbb{R}^+$ is a friction coefficient that determines the strength of the noise injection into the velocities. With respect to the Hamiltonian component, Hamiltonian dynamics can be used in Markov chain Monte Carlo methods to accelerate sampling and efficiently explore complex probability distributions. The Hamiltonian component can help to quickly and smoothly converge the initial joint data-velocity distribution to the equilibrium, or prior. Furthermore, Hamiltonian dynamics on their own may be trivially invertible, which is also beneficial in a situation when using this diffusion for training SGMs. The O term corresponds to an Ornstein-Uhlenbeck process in the velocity component, which injects noise such that the diffusion dynamics properly converge to equilibrium for any $\Gamma>0$. It can be shown that the equilibrium distribution of this diffusion is $p_{EQ}(u) = N(x; O_d, I_d) N(v; O_d, MI_d)$.

Figures 3A, 3B, 3C:
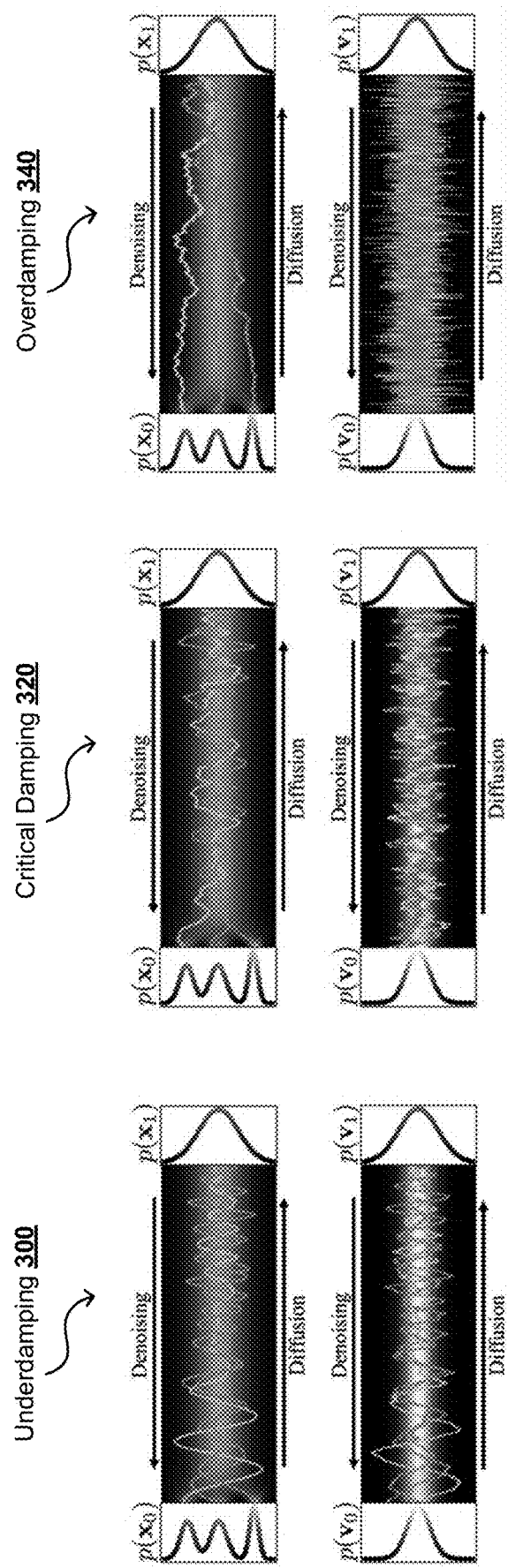
FIGS. 3A, 3B, and 3C illustrate plots of Langevin dynamics for different mass and friction parameter values, in accordance with various embodiments.

There can be an important balance between mass M and friction F, as illustrated in FIGS. 3A, 3B, and 3C. For $\Gamma^2<4M$ (underdamped Langevin dynamics 300) as illustrated in FIG. 3A, the Hamiltonian component can dominate, which implies oscillatory dynamics of $x_t$ and $v_t$ that slow down convergence to equilibrium. For $\Gamma^2>4M$ (overdamped Langevin dynamics 340) as illustrated in FIG. 3C, the O-term dominates, which can also slow convergence since the accelerating effect by the Hamiltonian component is suppressed due to the strong noise injection. For $\Gamma^2=4M$ (critical damping 320) as illustrated in FIG. 3B, an ideal (or near-ideal) balance can be achieved whereby convergence to $p_{EQ}(u)$ occurs relatively quickly in a smooth manner without oscillations. One approach would then be to set $\Gamma^2=4M$ to arrive at critically-damped Langevin diffusion (CLD), as in FIG. 3B. Various diffusions may correspond to overdamped Langevin dynamics with high friction coefficients $\Gamma$, and in prior approaches noise was injected directly into the data variables (e.g., pixels for images). In a CLD-based approach as presented herein, only velocity variables may be subject to direct noise, and the data is perturbed only indirectly due to the coupling between $x_t$ and $v_t$.

In at least one embodiment, CLD can be utilized with a forward diffusion process in SGMs, at least to attempt to take advantage of the convergence properties of CLD. To this end, a joint $p(u_0)=p(x_0) p(v_0)=p_{data}(x_0)N(v_0; O_d, \gamma MI_d)$ can be initialized with hyperparameter $\gamma \ll 1$ and letting the distribution diffuse towards the tractable equilibrium—or prior—distribution $p_{EQ}(u)$. Corresponding score functions can then be learned, and CLD-based SGMs defined. A score matching (SM) objective can be obtained, as may be given by:

$$\min_\theta E_{t \in [0,T]} E_{u_t \sim p_t(u_t)} [\lambda(t) \| s_\theta(u_t, t) - \nabla_{v_t} \log p_t(u_t) \|_2^2]$$

Such an objective in this embodiment uses only the velocity gradient of the log-density of the joint distribution, $\nabla_{v_t} \log p_t(u_t)$. This is a direct consequence of injecting noise into the velocity variables only. Without loss of generality, $p_t(u_t)=p_t(x_t, v_t)=p_t(v_t|x_t)p_t(x_t)$, which can then lead to:

$$\nabla_{v_t} \log p_t(u_t) = \nabla_{v_t}[\log p_t(v_t|x_t) + \log p_t(x_t)] = \nabla \log p_t(v_t|x_t)$$

Taking such an approach, the neural network-defined score model $s_\theta(u_t, t)$ in CLD may only need to learn the score of the conditional distribution $p_t(v_t|x_t)$, which in at least some instances can be an easier task than learning the score of $p_t(x_t)$, as in prior approaches, or the score of the joint $p_t(u_t)$. This velocity distribution can be initialized from a simple Normal distribution, such that $p_t(v_t|x_t)$ is closer to a Normal distribution for all $t>0$ (and for any $x_t$) than $p_t(x_t)$ itself. This is most evident at $t=0$, as the data and velocity distributions are independent at $t=0$ and the score of $p_0(v_0|x_0)p_0(v_0)$ corresponds to the score of the Normal distribution $p_0(v_0)$ from which the velocities are initialized, whereas the score of the data distribution $p_0(x_0)$ is highly complex and can even be unbounded. In at least one embodiment, a score to be learned by the model can be more similar to a score corresponding to a Normal distribution for CLD than for VPSDE. It was also observed that CLD-based SGMs have significantly simpler and smoother neural networks than VPSDE-based SGMs for most t, in particular when leveraging a mixed score formulation.

Training directly with the above equation may require access to the marginal distribution $p_t(v_t)$ in at least some embodiments. As mentioned, it is possible to employ denoising score matching (DSM) and sample $u_0$, then diffuse those samples, which would lead to a tractable objective. However, in CLD the distribution at $t=0$ is the product of a complex data distribution and a Normal distribution over the initial velocity. Accordingly, in at least one embodiment a hybrid of score matching and denoising score matching can be performed, which will be referred to herein as hybrid score matching (HSM). In HSM, samples can be drawn from $p_0(x_0)=p_{data}(x_0)$ as in DSM, with those samples then being diffused while marginalizing over the full initial velocity distribution as may be given by:

$$p_0(v_0) = \mathcal{N}(v; O_d, \gamma MI_d)$$

as in regular SM. Since $p_0(v_0)$ is Normal (and f and G affine), $p(u_t|x_0)$ is also Normal and this remains tractable. This HSM objective can then be written as:

$$\min_\theta E_{t \in [0,T]} E_{x_0 \sim p_0(x_0)} E u_t \sim p_t(u_t|x_0)[\lambda(t) \| s_\theta(u_t, t) - \nabla_{v_t} \log p_t(u_t|x_0) \|_2^2]$$

In HSM, the expectation over $p_0(v_0)$ is solved analytically, while for DSM a sample-based estimate would typically be used. HSM can thus reduce the variance of a training objective compared to pure DSM. Further, when drawing a sample $u_0$ to diffuse in DSM, an infinitely sharp Normal with unbounded score can effectively be placed at $u_0$, which requires undesirable modifications or truncation tricks for stable training. Using DSM might result in losing some benefits of the CLD framework discussed previously, HSM is tailored to CLD and its use can help to avoid such unbounded scores.

In at least some instances, it can be beneficial to parameterize the score model to predict the noise that was used in the reparametrized sampling to generate perturbed samples $u_t$. For CLD, $u_t = \mu_t(x_0) + L_t \epsilon_{2d}$, where $\Sigma_t = L_t L_t^T$ is the Cholesky decomposition of the covariance matrix of $p_t(u_t|x_0)$, $\epsilon_{2d} \sim \mathcal{N}(\epsilon_{2d}; 0_{2d}, I_{2d})$, and $\mu_t(x_0)$ is the mean of $p_t(u_t|x_0)$. Furthermore, $\nabla_{v_t} \log p_t(u_t|x_0) = -\epsilon_{d:2d}$, where $E_{d:2d}$ denotes those d components of $E_{2d}$ that actually affect $\nabla_{v_t} \log p_t(u_t|x_0)$, since only velocity gradients are taken and not all are relevant. Then, given:

With $$\Sigma_t = \underbrace{\begin{pmatrix} \Sigma_t^{xx} & \Sigma_t^{xv} \\ \Sigma_t^{xv} & \Sigma_t^{vv} \end{pmatrix}}_{\text{"per-dimension" covariance matrix}} \otimes I_d$$

it follows that:

$$\ell_t := \sqrt{\frac{\Sigma_t^{xx}}{\Sigma_t^{xx}\Sigma_t^{vv} - (\Sigma_t^{xv})^2}}.$$

It can be beneficial to assume that the diffused marginal distribution is Normal at all times and parametrize the model with a Normal score and a residual "correction". For CLD, the score is Normal at t=0, due at least in part to the independently-initialized x and v at t=0. Similarly, the target score is close to Normal for large t approaching the equilibrium. Based on this, $s_\theta(u_t, t) = -\ell_t \alpha_\theta(u_t, t)$ can be parameterized with $\alpha_\theta(u_t, t) = \ell_t^{-1} v_t / \Sigma_t^{vv} + \alpha_\theta'(u_t, t)$, where $\Sigma_t^{vv}$ corresponds to the v-v component of the "per-dimension" covariance matrix of the Normal distribution $p_t(u_t|x_0=O_d)$. This can result from an assumption that $p_0(x_0) = \delta(x)$ when defining the analytic term of the score model. Formally, $-v/\Sigma_t^{vv}$ is the score of a Normal distribution with covariance $\Sigma_t^{vv} I_d$. This parameterization can be referred to as mixed score parameterization, with alternative model parameterizations possible. Given this definition, the HSM training objective becomes.

$$\min \mathbb{E}_{t\in[0,T]} \mathbb{E}_{x_0 \sim p_0(x_0)} \mathbb{E}_{\epsilon_{2d} \sim N(e_{2d}, 0_{2d}, I_{2d})} [\lambda(t)\ell_t^2 \|\epsilon_{d:2d} - \alpha_\theta(u_t = \mu_t(x_0) + L_t \epsilon_{2d}, t)\|_2^2]$$

which corresponds to training the model to predict the noise only injected into the velocity during reparametrized sampling of $u_t$.

For $\lambda(t) = \Gamma \beta$, the objective corresponds to maximum likelihood learning. In at least some embodiments, an objective better suited for high quality image synthesis can be obtained by setting $\lambda(t) = \ell_t^{-2}$, which corresponds to "dropping the variance pre-factor" $\ell_t^2$.

Figure 4:
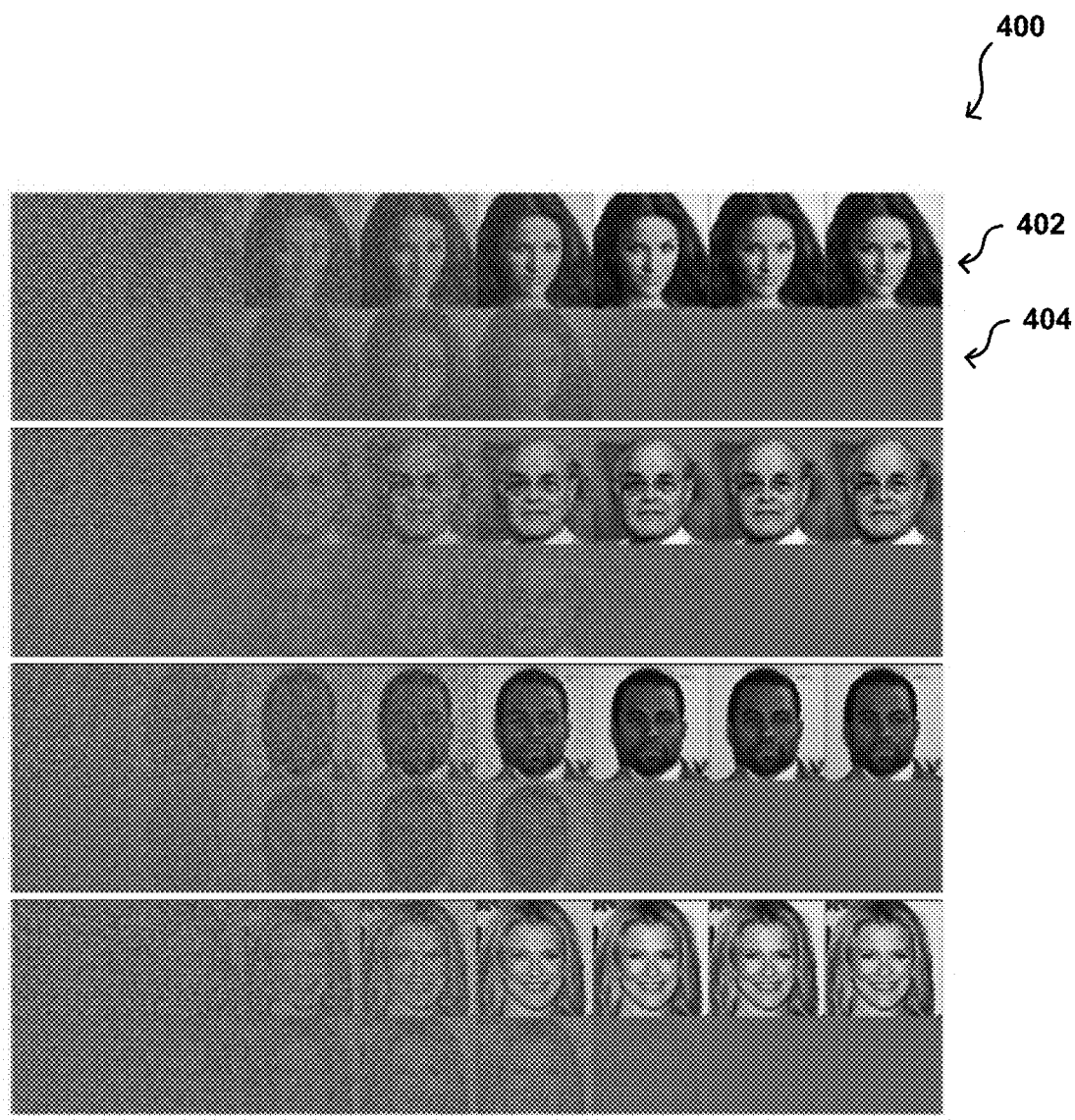
FIG. 4 illustrates generation of clean data and velocity values for different noise inputs, in accordance with various embodiments.

FIG. 4 illustrates a set 400 of iterative states of a reverse diffusion process that can be generated by a generative model in at least one embodiment. As depicted in FIG. 4, the use of critically-damped Langevin dynamics shows how initial noise in both the data and velocity components on the left, can result in clean image data 402 and velocity data 404 on the right. When the image data is mostly noise, and there is little correlation between pixel values, the velocity data will also be mostly noise. As the image representation comes into focus with an intermediate amount of noise, the velocity data (or change in values) for various pixel locations can be seen to be correlated with the image data, as the denoising process removes noise corresponding to locations of features of the object. Once the object nears its final appearance, the velocity data can see to merge to a relatively smooth and constant value.

In order to sample from a CLD-based SGM, one approach is to directly simulate the reverse-time diffusion process, while another approach is to instead solve the corresponding probability flow ODE. To simulate the SDE of the reverse-time diffusion process, a solver can be used that is tailored to CLD-based models. An example generative SDE can be written as (with $\bar{u}_t = u_{T-t}$, $\bar{x}_t = x_{T-t}$, $\bar{v}_t = v_{T-t}$):

$$\begin{pmatrix} d\bar{x}_t \\ d\bar{v}_t \end{pmatrix} = \underbrace{\begin{pmatrix} -M^{-1}\bar{v}_t \\ \bar{x}_t \end{pmatrix} \beta dt}_{A_H} +$$

$$\underbrace{\begin{pmatrix} 0 \\ -\Gamma M^{-1}\bar{v}_t \end{pmatrix} \beta dt + \begin{pmatrix} 0 \\ \sqrt{2\Gamma\beta} dw_t \end{pmatrix}}_{A_O} + \underbrace{\begin{pmatrix} 0 \\ 2\Gamma[s(\bar{u}_t, T-t) + M^{-1}\bar{v}_t] \end{pmatrix} \beta dt}_{S}$$

This generative SDE consists of a Hamiltonian component $A_H$, an Ornstein-Uhlenbeck process $A_O$, and the score model term S. A Liouville operator formalism can be used, as well as Fokker-Planck equation corresponding to the generative SDE, which may be given by:

$$\partial p_t(\bar{u}_t)/\partial t = (\hat{L}_A^* + \hat{L}_S^*) p_t(\bar{u}_t)$$

where $\hat{L}_A^*$ and $\hat{L}_S^*$ are the noncommuting Liouville operators corresponding to the A:=$A_H$+$A_O$ and S terms, respectively. A formal but intractable solution of the generative SDE can be constructed as $\bar{u}_t = e^{t(\hat{L}_A^* + \hat{L}_S^*)} a_0$, where the operator $e^{t(\hat{L}_A^* + \hat{L}_S^*)}$ (also known as a classical propagator) cam propagate states $D_0$ for time t according to the dynamics defined by the combined Liouville operators $\hat{L}^*_A + \hat{L}^*_S$. Although this operation may not be analytically tractable, the operation can serve as starting point to derive a practical integrator. Using the symmetric Trotter theorem or Strang splitting formula as well as the Baker-Campbell-Hausdorff formula, it can be shown that:

$$e^{t(\hat{L}_A^* + \hat{L}_S^*)} = \lim_{N \to \infty} \left[e^{\frac{\delta t}{2}\hat{L}_A^*} e^{\delta t \hat{L}_S^*} e^{\frac{\delta t}{2}\hat{L}_A^*}\right]^N \approx \left[e^{\frac{\delta t}{2}\hat{L}_A^*} e^{\delta t \hat{L}_S^*} e^{\frac{\delta t}{2}\hat{L}_A^*}\right]^N + O(N\delta t^3)$$

with time step $\delta t$: =t/N, where $N \in \mathbb{N}^+$. This expression suggests that instead of directly evaluating the intractable $e^{t(\hat{L}_A^* + \hat{L}_S^*)}$, the dynamics can be discretized over t into N pieces of step size $\delta t$, such that there may only be a need to apply the individual $$e^{\frac{\delta t}{2}\hat{L}_A^*}$$

and $e^{\delta t \hat{L}_S^*}$ times one after another for small time steps $\delta t$. A finer discretization may result in a smaller error, as since N=t/$\delta t$ the error effectively scales as $O(\delta t^2)$ for fixed t. This implies that an integration method may be successful. Indeed, $$e^{\frac{\delta t}{2}\hat{L}_A^*} \bar{u}_t$$

is available in closed form, but $e^{\delta t \hat{L}_S^*} \bar{u}_t$ is not available in closed form. Therefore, this latter component of the integrator can be approximated via a standard Euler step. The integrator can then have an error that is of the same order as those for other EM approaches. Nevertheless, as long as the dynamics are not dominated by the S component, such an integration scheme can be more accurate than these other EM approaches, at least since the analytically tractable part was split off and only an Euler approximation is used for the S term. This model can then learn only the score of the conditional distribution $p_t(v_t|x_t)$, which can be close to Normal for much of the diffusion, such that the S term will be small, indicating that the generative SDE dynamics are likely to be dominated by $A_H$ and $A_O$ in practice.

In at least one embodiment, an architecture can be selected for a task such as image synthesis, implementing CLD-based SGMs using NCSN++ and DDPM++ with 6 input channels (for velocity and data). Hyperparameters of the CLD can be chosen as $\beta=4$, $\Gamma=1$ (or equivalently $M^{-1}=4$), with the variance scaling of the initial velocity distribution set to $\lambda=0.04$ with an HSM objective with the weighting $\lambda(t)=1_t^{-2}$ to promote image quality. Model samples can be generated via probability flow using a Runge-Kutta 4(5) method; reverse-time generative SDE sampling using either EM or SSCS. For methods without adaptive step size (e.g., EM and SSCS), evaluation times can be used that are chosen according to a quadratic function. Image sample quality for CIFAR-10 can be measured via Fréchet inception distance (FID) with 50k samples. An upper bound on the negative log-likelihood (NLL) can be evaluated, as may be given by $$-\log p(x_0) \leq -\mathbb{E}_{v_0 \sim p(v_0)} \log p_\varepsilon(x_0, v_0) - H,$$

where H is the entropy of $p(v_0)$ and $\log p_\varepsilon(x_0, v_0)$ is an unbiased estimate of $\log p(x_0, v_0)$ from the probability flow ODE. The stochasticity of $\log p_\varepsilon(x, v)$ may prevent performing importance-weighted NLL estimation over the velocity distribution.

Figure 5:
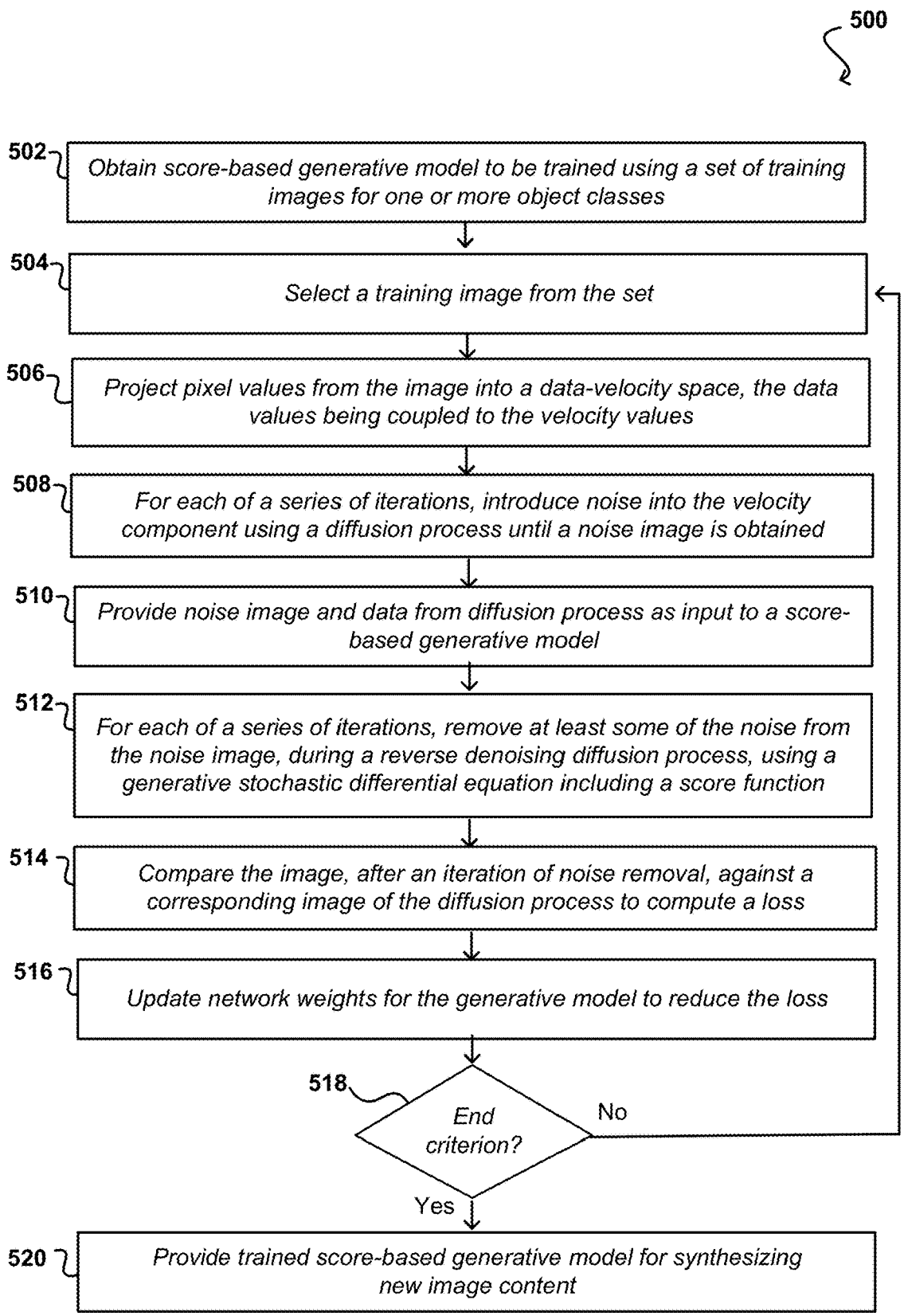
FIG. 5 illustrates an example process for training a score-based generative model, in accordance with various embodiments.

FIG. 5 illustrates an example process 500 for training a score-based generative model that can be used in accordance with various embodiments. It should be understood that for this and other processes presented herein that there may be additional, fewer, or alternative steps performed or similar or alternative orders, or at least partially in parallel, within the scope of the various embodiments unless otherwise specifically stated. Further, although this example is described with respect to synthesizing image data, such a process can be used advantageously for generating various other types of data or content as well, as may include audio or video, 3D shapes (and content more generally), super-resolution images, content for image-to-image translation, and image editing content, among other such options. In this example, a score-based generative model is obtained 502 that is to be trained using a set of training images. The training images each include a representation of an object in this example, where the set of training data includes images representing objects of one or more classes, categories, or object types. At least a portion of the training set may be selected for training, with a remainder used for evaluation. Training can be performed using a sequence of selected training images. For a given training pass, a training image can be selected 504 from the set of training images. This may include an image including a representation of an object of a class for which this model or network is being trained. Pixel values determined for the selected image can be projected 506 into a data-velocity space, which includes both data values for various pixels as well as velocity values (or other auxiliary values) for those pixels, where the velocity represents a time-derivative of the pixel-specific data values (the time along the diffusion process). This can be true for all pixels independently. In this multi-dimensional data-velocity space, the points represent a coupling between the data values and the velocity values.

For each of a series of iterations of a forward joint diffusion process, an amount of noise is introduced 508 into the velocity components of the training image, which then impacts the data components through the coupling to the velocity components. The noise introduced may include similar or different amounts of noise added or introduced for each iteration, and the noise that is added can be selected at random or according to a noise generation algorithm, among other such options. For each iteration, the object represented in the image will become slightly less apparent as the amount of noise is increased, until a final diffused image is obtained that represents only (or almost only) noise values. Once a final noise image is obtained from this forward diffusion process, a reverse process can be performed wherein a generative model learns to undo the diffusion introduced during these forward iterations. In this example, for each of a series of reverse iterations at least some of the noise is effectively removed from the image. This equates to generating a new version of the image that has slightly less noise than the prior version of the image, or has slightly more detail about the type of object to be represented in the image. Data values for the version of the image to be generated can be determined using a generative stochastic differential equation that includes a score function, where the score function is determined using a velocity value matching process. This process can continue until a "final" generated image is produced that should be free from noise, and includes what should be an accurate representation of the object in the original training image. For any given reverse iteration, the image can be compared 514 against a corresponding image version from the forward diffusion process in order to compute a loss value or other metric representative of a difference between inferred and actual image versions. In this example, the network weights for the generative model are updated 516 to attempt to reduce the loss, and make the generative model more accurate in its pixel value inferences. After a training pass has completed for a current image, it can be determined 518 whether an end criterion has been met, such as a maximum number of training passes being reached, the model converging, or all training data being used. If not, the process can continue with a next training image. If at least one such end criterion has been satisfied then this trained score-based generative model can be provided 520 for synthesizing new image content.

As discussed, aspects of various approaches presented herein can be lightweight enough to execute on a device such as a client device, such as a personal computer or gaming console, in real time. Such processing can be performed on content (e.g., a rendered version of a unique asset) that is generated on, or received by, that client device or received from an external source, such as streaming data or other content received over at least one network. In some instances, the processing and/or determination of this content may be performed by one of these other devices, systems, or entities, then provided to the client device (or another such recipient) for presentation or another such use.

Figure 6:
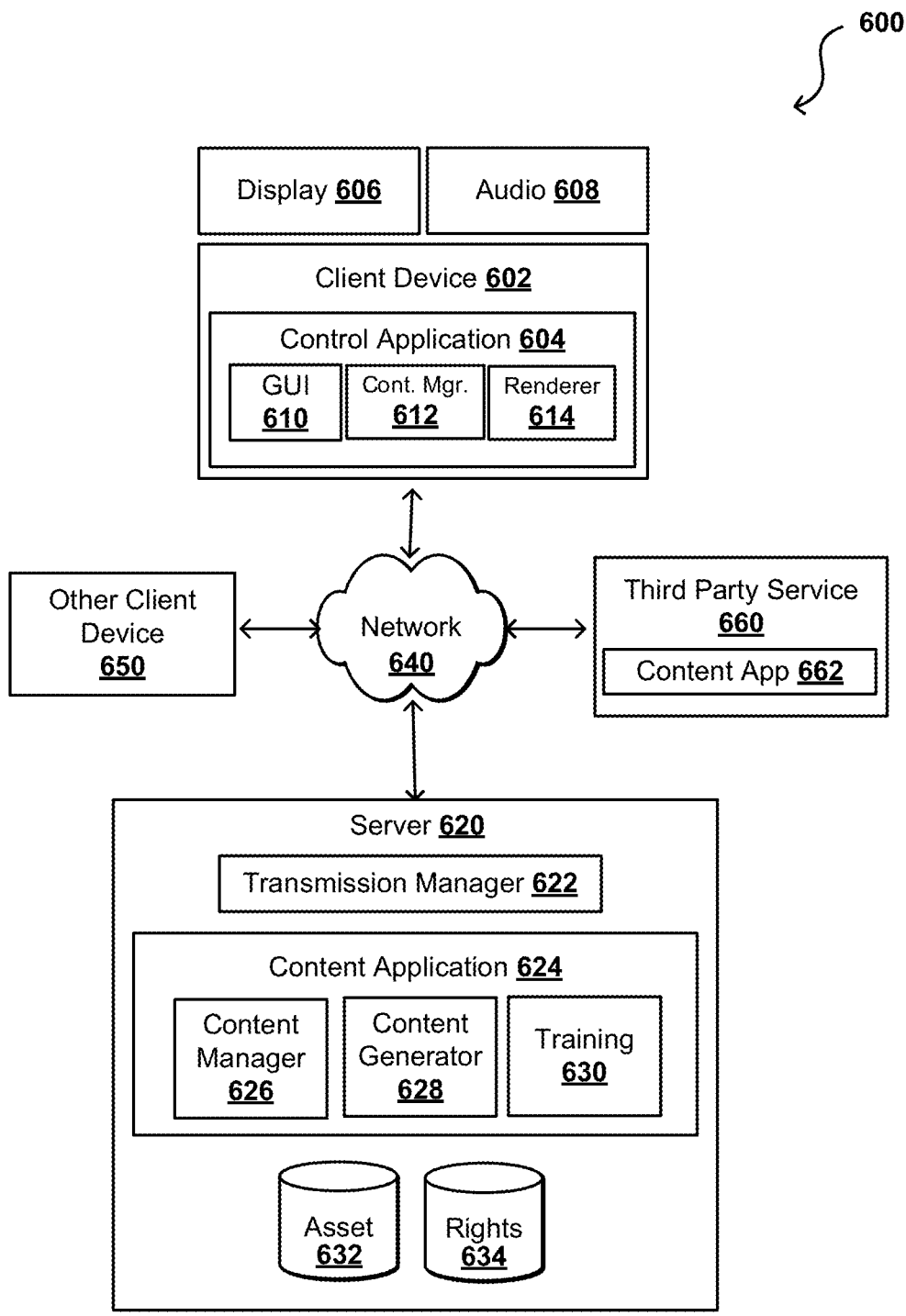
FIG. 6 illustrates components of a distributed system that can be utilized to train or perform inferencing using a score-based generative model, according to at least one embodiment.

As an example, FIG. 6 illustrates an example network configuration 600 that can be used to provide, generate, modify, encode, process, and/or transmit data or other such content. In at least one embodiment, a client device 602 can generate or receive data for a session using components of a control application 604 on client device 602 and data stored locally on that client device. In at least one embodiment, a content application 624 executing on a server 620 (e.g., a cloud server or edge server) may initiate a session associated with at least client device 602, as may utilize a session manager and user data stored in a user database 634, and can cause content 632 to be determined by a content manager 626. A content manager 626 may work with a content generator 628 to generate or synthesize content to be provided for presentation via the client device 602. In at least one embodiment, this content generator 628 can use a score-based generative model to generate specific types of content, where that model may have been trained using a training module 630 on, or in communication with, the server 620. At least a portion of the generated data or content may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding control application 604, which may also or alternatively include a graphical user interface 610, content manager 612, and renderer 614 for use in providing content for presentation via the client device 602. A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 634, to client device 602. In at least one embodiment, at least a portion of this content can be obtained or streamed from another source, such as a third party service 660 or other client device 650, that may also include a content application 662 for generating or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
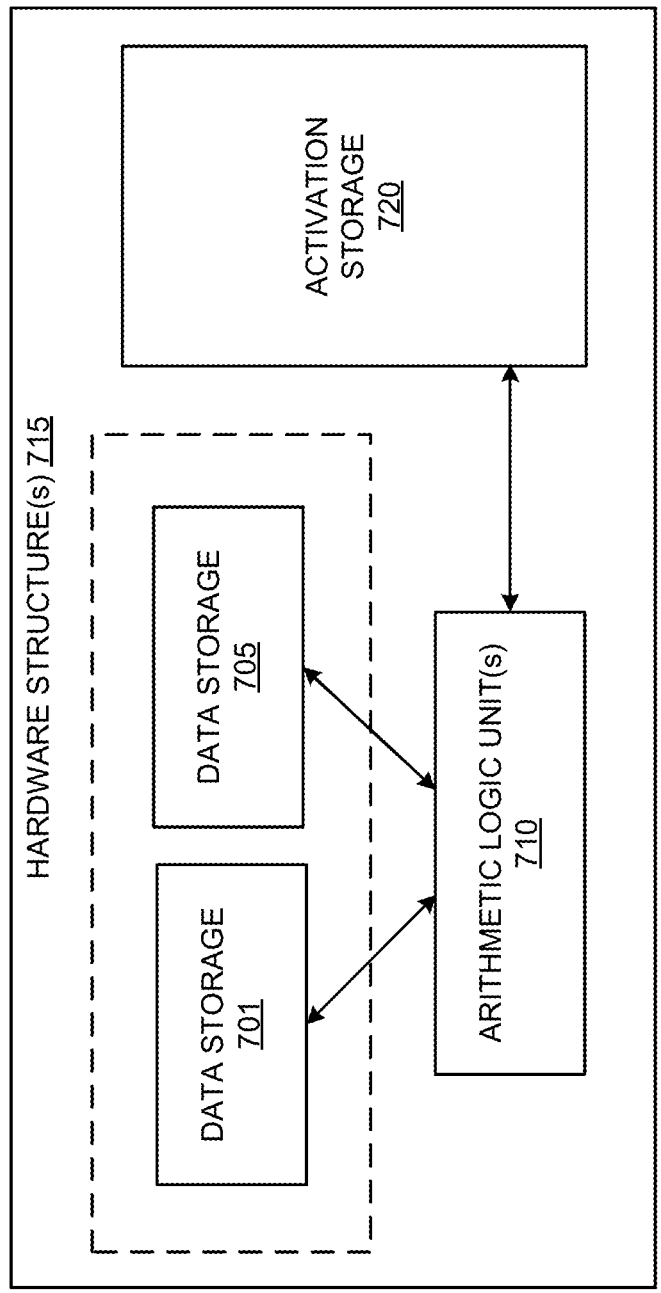
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALU(s) 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7A may be used in conjunction with central processing unit ("CPU") hardware, graphics processing unit ("GPU") hardware or other hardware, such as field programmable gate arrays ("FPGAs").

Figure 7B:
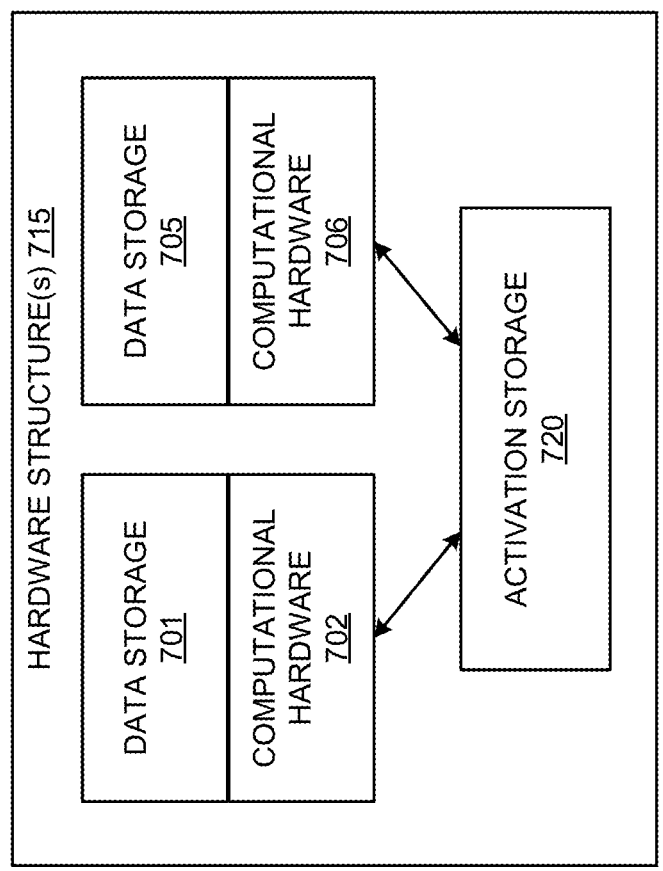
FIG. 7B illustrates inference and/or training logic, according to at least one embodiment.

FIG. 7B illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7B may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7B, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pairs 701/702" of code and/or data storage 701 and computational hardware 702 is provided as an input to "storage/computational pairs 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
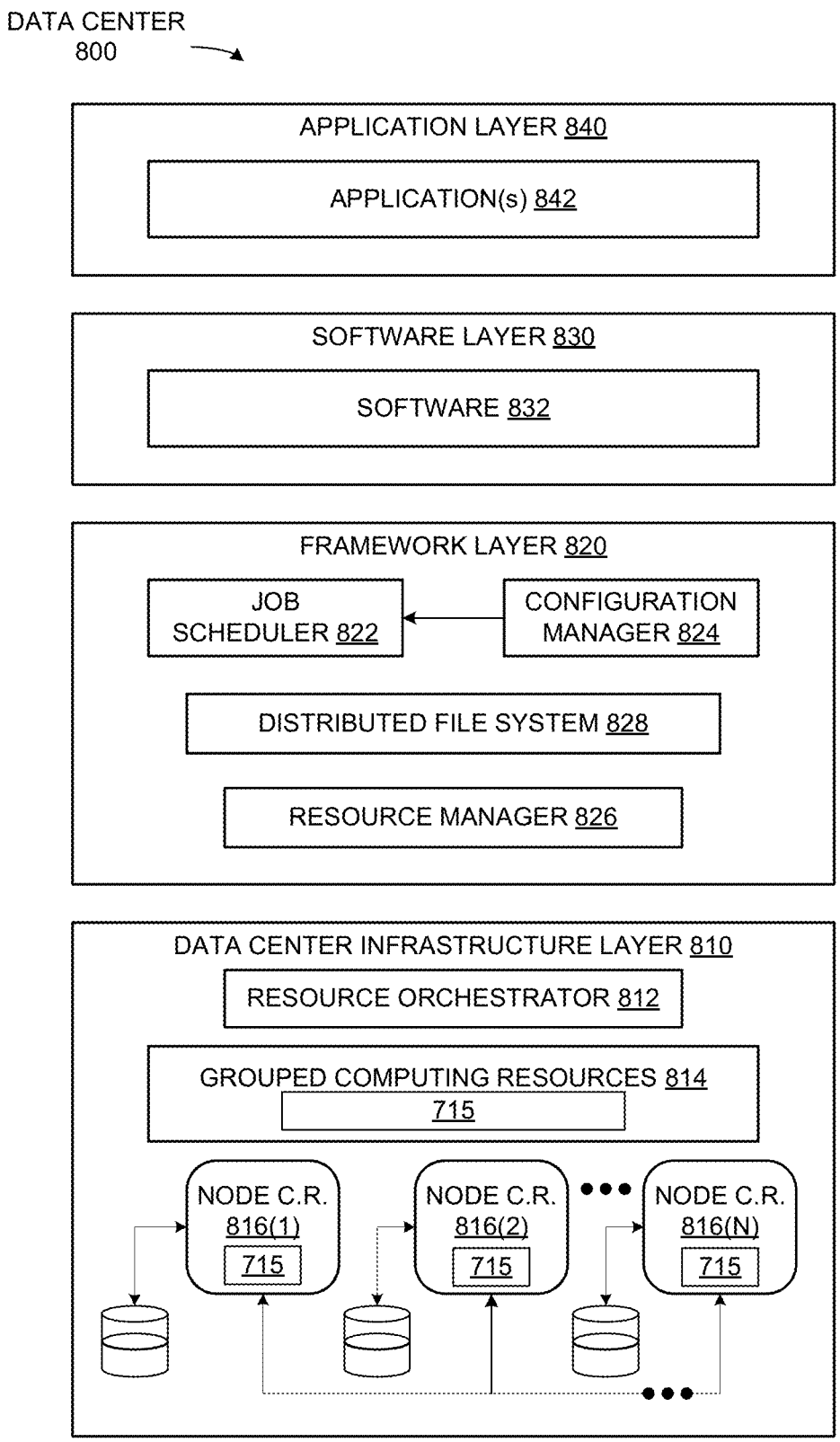
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may be grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator 812 may include hardware, software or some combination thereof.

In at least one embodiment, as shown in FIG. 8, framework layer 820 includes a job scheduler 822, a configuration manager 824, a resource manager 826, and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud, and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to train a generative model, such as a score-based generative model, to generate or synthesize content.

Computer Systems

Figure 9:
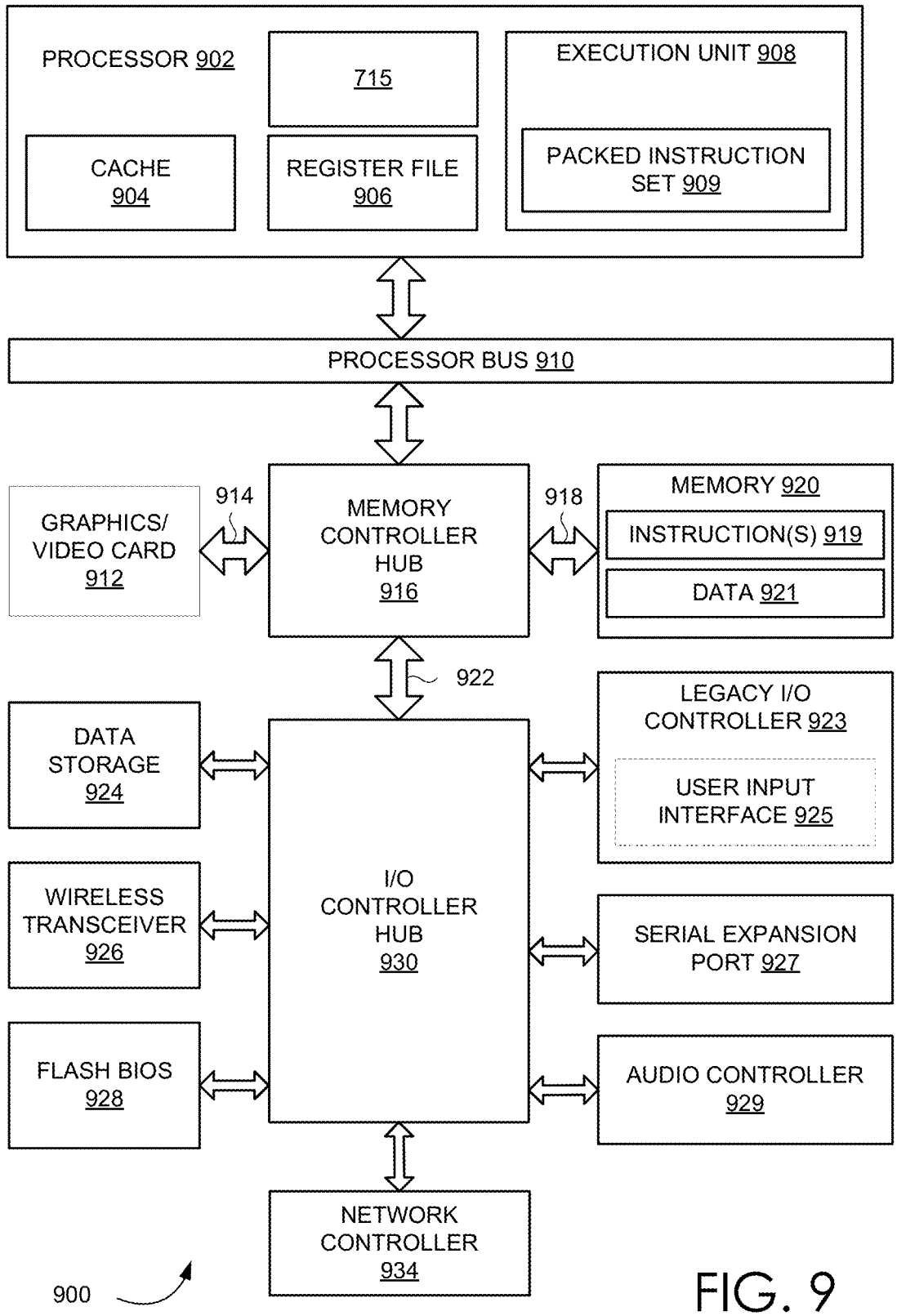
FIG. 9 illustrates a computer system, according to at least one embodiment.

FIG. 9 is a block diagram illustrating an exemplary computer system 900, which may be a system with interconnected devices and components, a system-on-a-chip (SOC) or some combination thereof formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computing ("CISC") microprocessor, a reduced instruction set computing ("RISC") microprocessor, a very long instruction word computing ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache 904 may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor data bus 910 for performing operations on packed data, which may eliminate need to transfer smaller units of data across processor data bus 910 to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input interface 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to train a generative model, such as a score-based generative model, to generate or synthesize content.

Figure 10:
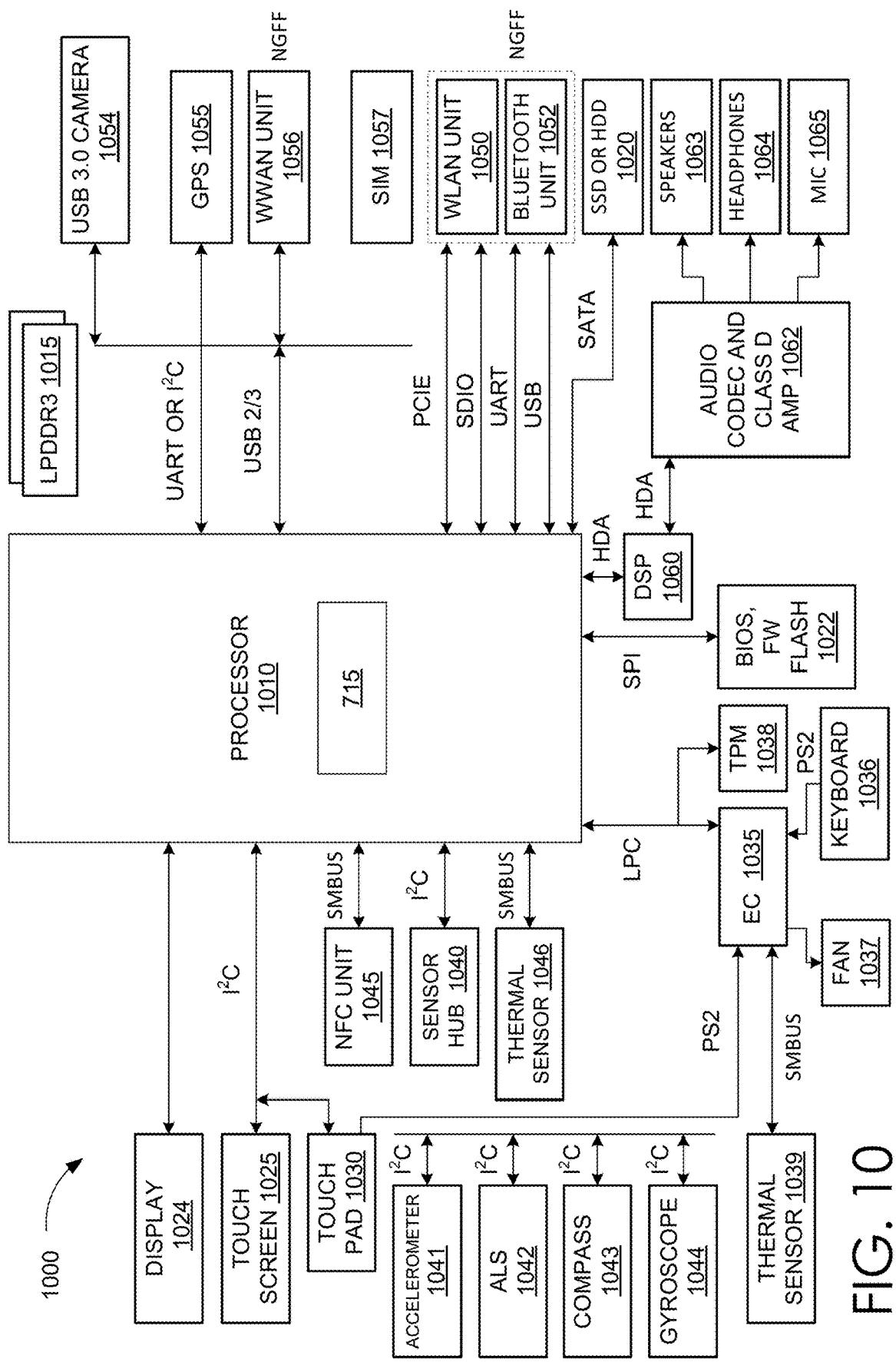
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, electronic device 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates an electronic device 1000, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects ((e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1036, and a touch pad 1030 may be communicatively coupled to EC 1035. In at least one embodiment, speakers 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1062 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to train a generative model, such as a score-based generative model, to generate or synthesize content.

Figure 11:
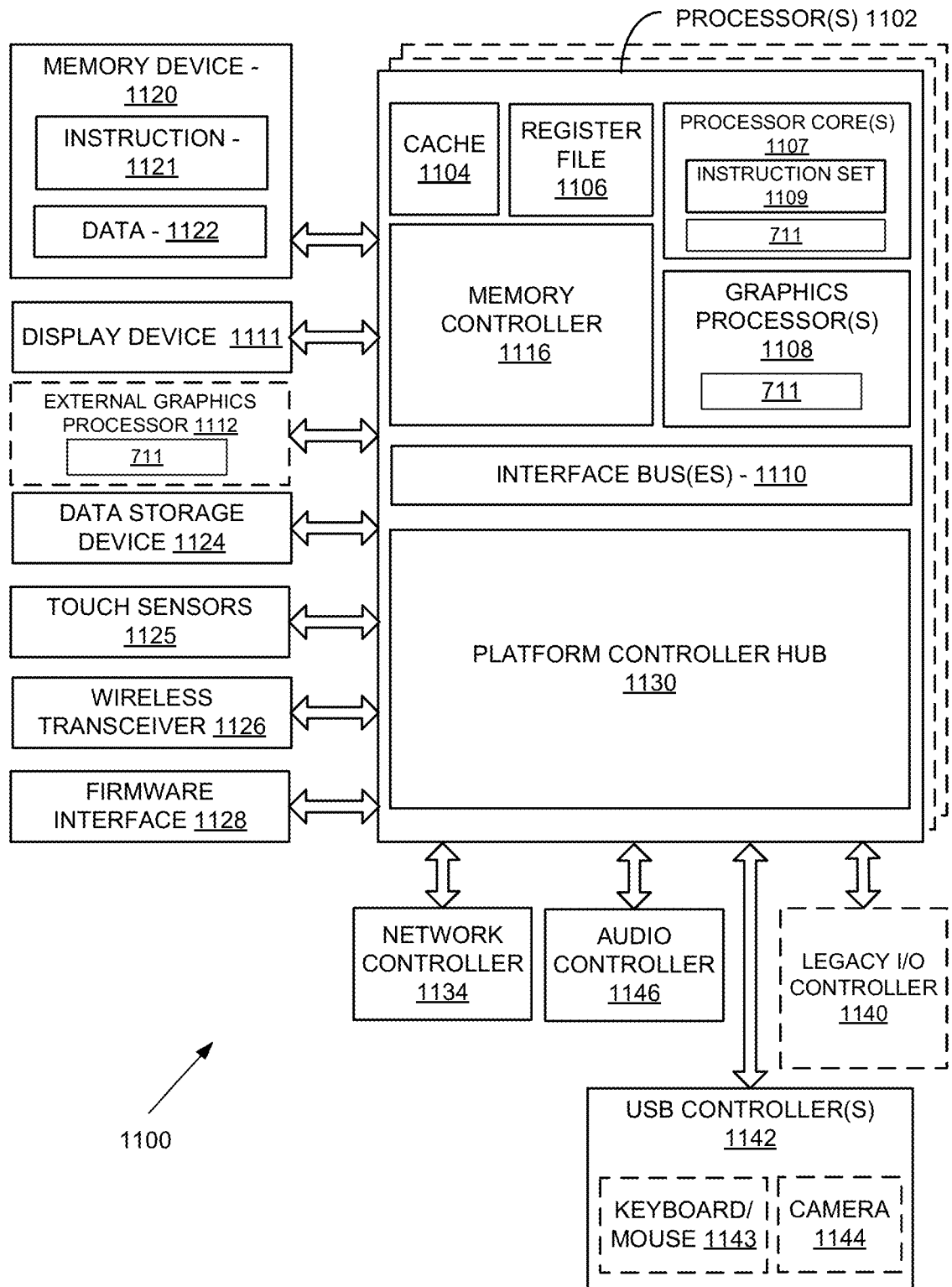
FIG. 11 illustrates at least portions of a graphics processor, according to one or more embodiments.

FIG. 11 is a block diagram of a processing system, according to at least one embodiment. In at least one embodiment, processing system 1100 includes one or more processor(s) 1102 and one or more graphics processor(s) 1108, and may be a single processor desktop system, a multiprocessor workstation system, or a server system having a large number of processor(s) 1102 or processor core(s) 1107. In at least one embodiment, processing system 1100 is a processing platform incorporated within a system-on-a-chip (SoC) integrated circuit for use in mobile, handheld, or embedded devices.

In at least one embodiment, processing system 1100 can include, or be incorporated within a server-based gaming platform, a game console, including a game and media console, a mobile gaming console, a handheld game console, or an online game console. In at least one embodiment, processing system 1100 is a mobile phone, smart phone, tablet computing device or mobile Internet device. In at least one embodiment, processing system 1100 can also include, coupled with, or be integrated within a wearable device, such as a smart watch wearable device, smart eyewear device, augmented reality device, or virtual reality device. In at least one embodiment, processing system 1100 is a television or set top box device having one or more processor(s) 1102 and a graphical interface generated by one or more graphics processor(s) 1108.

In at least one embodiment, one or more processor(s) 1102 each include one or more processor core(s) 1107 to process instructions which, when executed, perform operations for system and user software. In at least one embodiment, each of one or more processor core(s) 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor core(s) 1107 may each process a different instruction set 1109, which may include instructions to facilitate emulation of other instruction sets. In at least one embodiment, processor core(s) 1107 may also include other processing devices, such a Digital Signal Processor (DSP).

In at least one embodiment, processor(s) 1102 includes cache memory ("cache") 1104. In at least one embodiment, processor(s) 1102 can have a single internal cache or multiple levels of internal cache. In at least one embodiment, cache 1104 is shared among various components of processor(s) 1102. In at least one embodiment, processor(s) 1102 also uses an external cache (e.g., a Level-3 (L3) cache or Last Level Cache (LLC)) (not shown), which may be shared among processor core(s) 1107 using known cache coherency techniques. In at least one embodiment, register file 1106 is additionally included in processor(s) 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor(s) 1102 and other components in processing system 1100. In at least one embodiment, interface bus(es) 1110, in one embodiment, can be a processor bus, such as a version of a Direct Media Interface (DMI) bus. In at least one embodiment, interface bus(es) 1110 is not limited to a DMI bus, and may include one or more Peripheral Component Interconnect buses ((e.g., PCI, PCI Express), memory buses, or other types of interface buses. In at least one embodiment processor(s) 1102 include an integrated memory controller 1116 and a platform controller hub 1130. In at least one embodiment, memory controller 1116 facilitates communication between a memory device 1120 and other components of processing system 1100, while platform controller hub (PCH) 1130 provides connections to I/O devices via a local I/O bus.

In at least one embodiment, memory device 1120 can be a dynamic random access memory (DRAM) device, a static random access memory (SRAM)device, flash memory device, phase-change memory device, or some other memory device having suitable performance to serve as process memory. In at least one embodiment memory device 1120 can operate as system memory for processing system 1100, to store data 1122 and instruction 1121 for use when one or more processor(s) 1102 executes an application or process. In at least one embodiment, memory controller 1116 also couples with an optional external graphics processor 1112, which may communicate with one or more graphics processor(s) 1108 in processor(s) 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub (PCH) 1130 enables peripherals to connect to memory device 1120 and processor(s) 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus(es) 1110. In at least one embodiment, audio controller 1146 is a multi-channel high definition audio controller. In at least one embodiment, processing system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controller(s) 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, processing system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processing system 1100. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to train a generative model, such as a score-based generative model, to generate or synthesize content.

Figure 12:
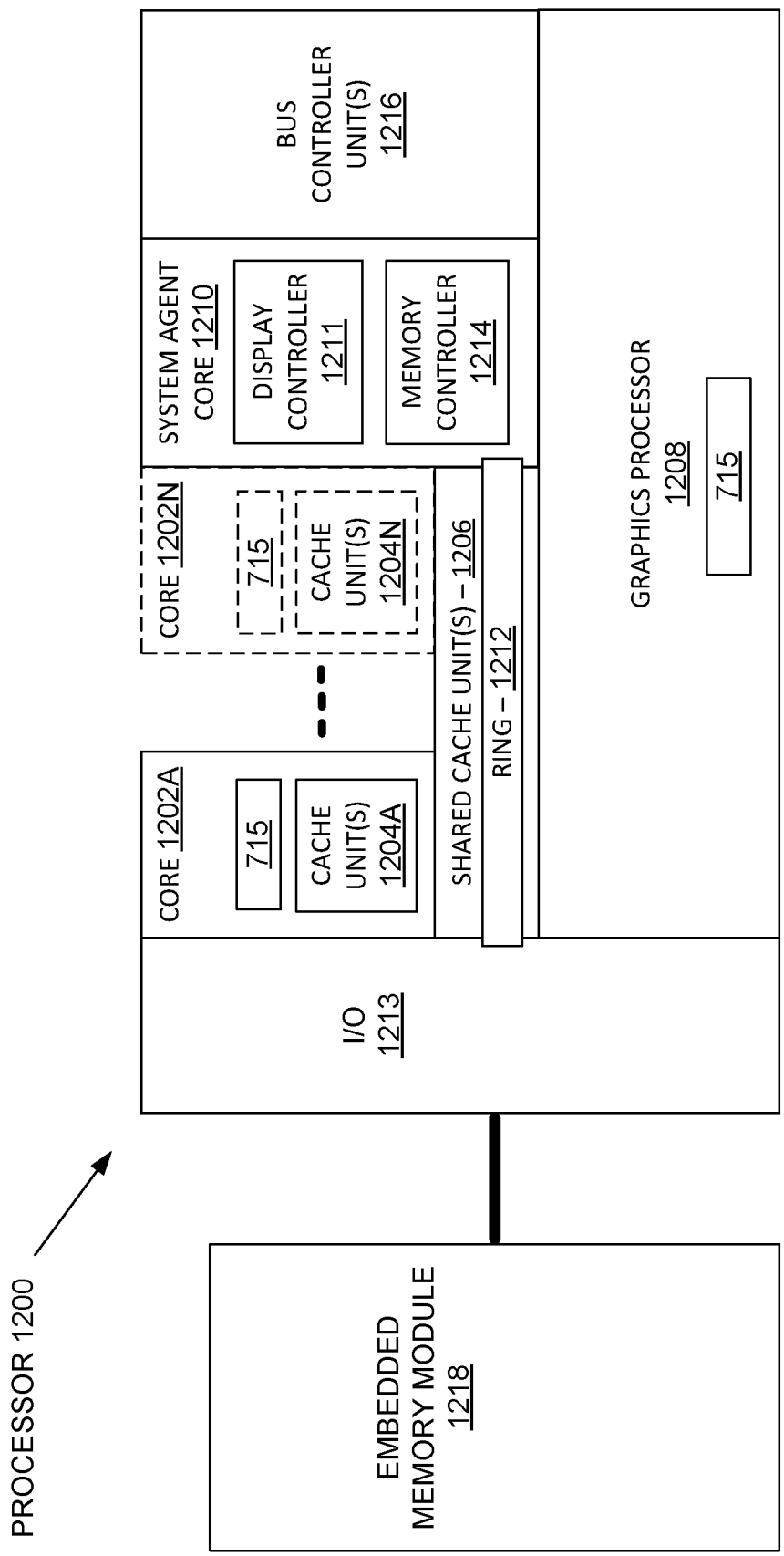
FIG. 12 illustrates at least portions of a graphics processor, according to one or more embodiments.

FIG. 12 is a block diagram of a processor 1200 having one or more processor core(s) 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor core(s) 1202A-1202N includes one or more internal cache unit(s) 1204A-1204N. In at least one embodiment, each processor core also has access to one or more shared cached unit(s) 1206.

In at least one embodiment, internal cache unit(s) 1204A-1204N and shared cache unit(s) 1206 represent a cache memory hierarchy within processor 1200. In at least one embodiment, cache unit(s) 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache unit(s) 1206 and 1204A-1204N.

In at least one embodiment, processor 1200 may also include a set of one or more bus controller unit(s) 1216 and a system agent core 1210. In at least one embodiment, one or more bus controller unit(s) 1216 manage a set of peripheral buses, such as one or more PCI or PCI express busses.

In at least one embodiment, system agent core 1210 provides management functionality for various processor components. In at least one embodiment, system agent core 1210 includes one or more integrated memory controller(s) 1214 to manage access to various external memory devices (not shown).

In at least one embodiment, one or more of processor core(s) 1202A-1202N include support for simultaneous multi-threading. In at least one embodiment, system agent core 1210 includes components for coordinating and processor core(s) 1202A-1202N during multi-threaded processing. In at least one embodiment, system agent core 1210 may additionally include a power control unit (PCU), which includes logic and components to regulate one or more power states of processor core(s) 1202A-1202N and graphics processor 1208.

In at least one embodiment, processor 1200 additionally includes graphics processor 1208 to execute graphics processing operations. In at least one embodiment, graphics processor 1208 couples with shared cache unit(s) 1206, and system agent core 1210, including one or more integrated memory controller(s) 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring based interconnect unit 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor core(s) 1202A-1202N and graphics processor 1208 use embedded memory module 1218 as a shared Last Level Cache.

In at least one embodiment, processor core(s) 1202A-1202N are homogenous cores executing a common instruction set architecture. In at least one embodiment, processor core(s) 1202A-1202N are heterogeneous in terms of instruction set architecture (ISA), where one or more of processor core(s) 1202A-1202N execute a common instruction set, while one or more other cores of processor core(s) 1202A-1202N executes a subset of a common instruction set or a different instruction set. In at least one embodiment, processor core(s) 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into processor 1200. For example, in at least one embodiment, training and/or inferencing techniques described herein may use one or more of ALUs embodied in graphics processor 1208, graphics core(s) 1202A-1202N, or other components in FIG. 12. Moreover, in at least one embodiment, inferencing and/or training operations described herein may be done using logic other than logic illustrated in FIGS. 7A and/or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used to train a generative model, such as a score-based generative model, to generate or synthesize content.

Virtualized Computing Platform

Figure 13:
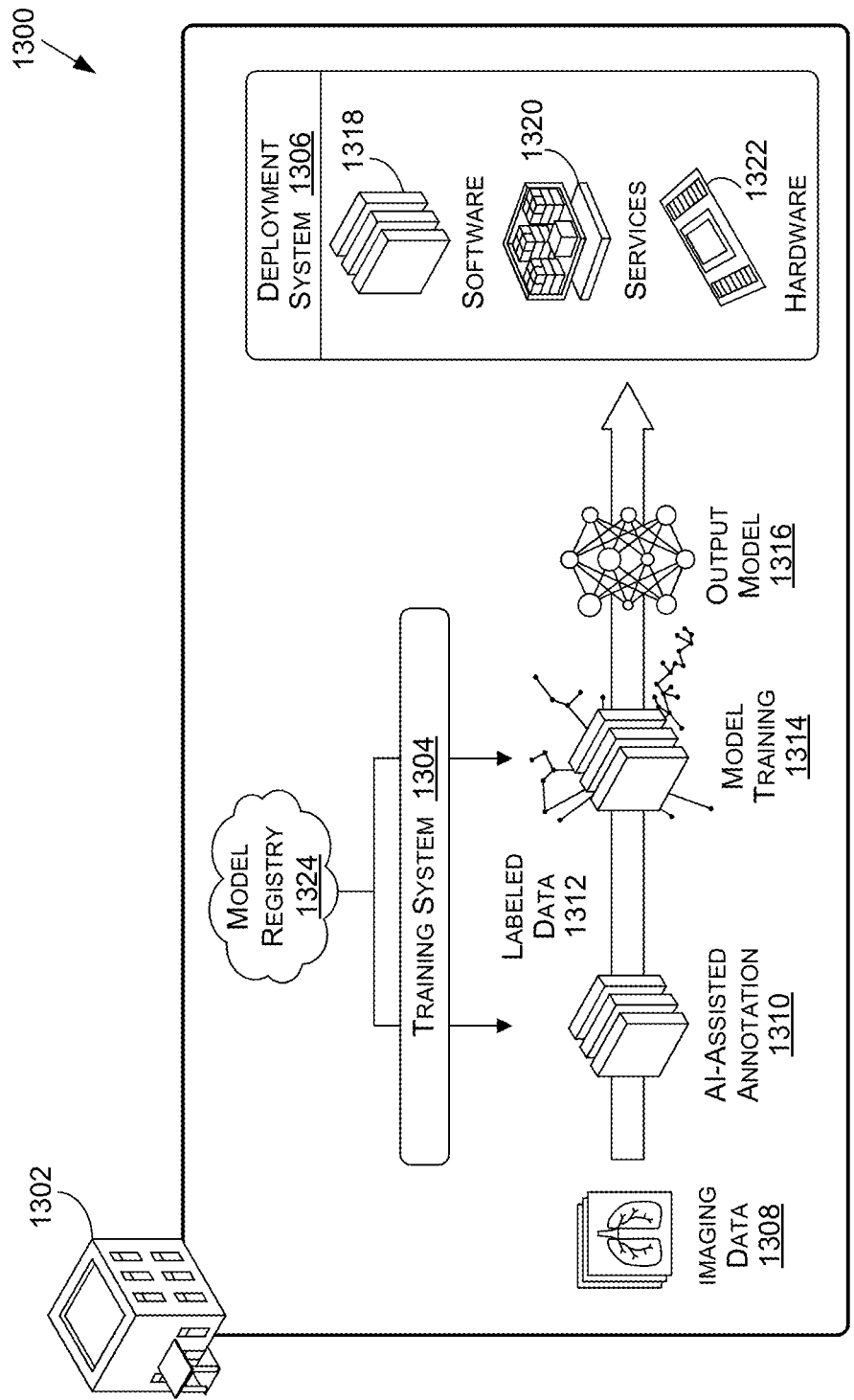
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facility(ies) 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility(ies) 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility(ies) 1302 using data 1308 (such as imaging data) generated at facility(ies) 1302 (and stored on one or more picture archiving and communication system (PACS) servers at facility(ies) 1302), may be trained using imaging or sequencing data 1308 from another facility(ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training system 1304 may include a scenario where facility(ies) 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotation 1310 may then be used directly, or may be adjusted or fine-tuned using an annotation tool to generate ground truth data. In at least one embodiment, AI-assisted annotation 1310, labeled data 1312, or a combination thereof may be used as ground truth data for training a machine learning model. In at least one embodiment, a trained machine learning model may be referred to as output model(s) 1316, and may be used by deployment system 1306, as described herein.

In at least one embodiment, training system 1304 may include a scenario where facility(ies) 1302 needs a machine learning model for use in performing one or more processing tasks for one or more applications in deployment system 1306, but facility(ies) 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility(ies) 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model(s) 1316—and may be used in deployment system 1306 to perform one or more processing tasks for one or more applications of a deployment system.

In at least one embodiment, training system 1304 may include a scenario where facility(ies) 1302 require a machine learning model for use in performing one or more processing tasks for one or more applications in deployment system 1306, but facility(ies) 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility(ies) 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotation 1310, labeled data 1312, or a combination thereof—may be used as ground truth data for retraining or updating a machine learning model. In at least one embodiment, a trained machine learning model may be referred to as output model(s) 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1420 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility(ies) 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output model(s) 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., processor 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by process 1300 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., process 1300 of FIG. 13). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform). In at least one embodiment, rather than each application that shares a same functionality offered by services 1320 being required to have a respective instance of services 1320, services 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc. —to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where services 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility(ies) 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

Figure 14:
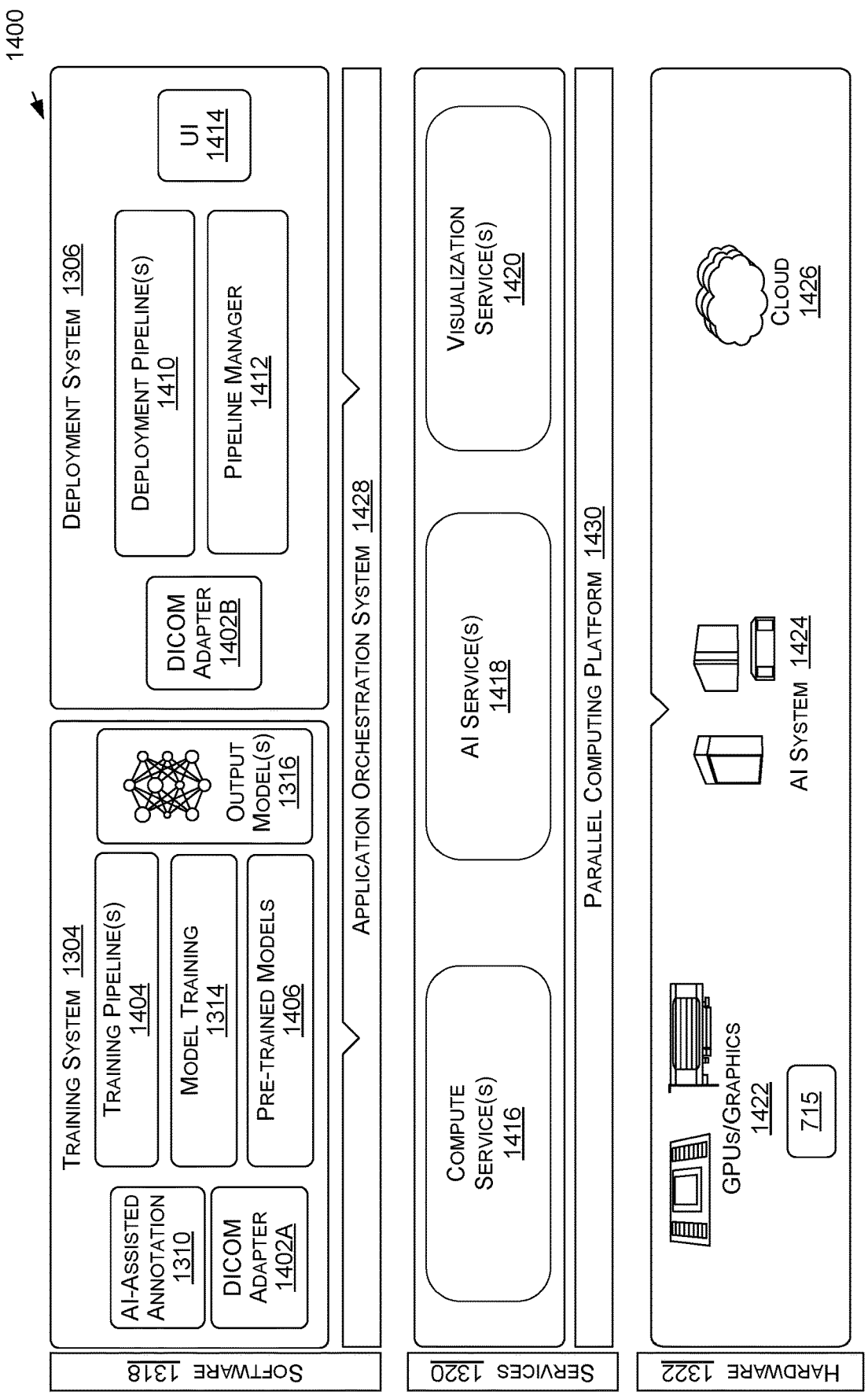
FIG. 14 is a system diagram for an example system for training, adapting, instantiating and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipeline(s) 1404, similar to those described herein with respect to FIG. 13. In at least one embodiment, where one or more machine learning models are to be used in deployment pipeline(s) 1410 by deployment system 1306, training pipeline(s) 1404 may be used to train or retrain one or more (e.g. pre-trained) models, and/or implement one or more of pre-trained models 1406 (e.g., without a need for retraining or updating). In at least one embodiment, as a result of training pipeline(s) 1404, output model(s) 1316 may be generated. In at least one embodiment, training pipeline(s) 1404 may include any number of processing steps, such as but not limited to imaging data (or other input data) conversion or adaption In at least one embodiment, for different machine learning models used by deployment system 1306, different training pipeline(s) 1404 may be used. In at least one embodiment, training pipeline(s) 1404 similar to a first example described with respect to FIG. 13 may be used for a first machine learning model, training pipeline(s) 1404 similar to a second example described with respect to FIG. 13 may be used for a second machine learning model, and training pipeline(s) 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained models 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipeline(s) 1404 may include AI-assisted annotation, as described in more detail herein with respect to at least FIG. 14. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation 1310 may be performed as part of deployment pipeline(s) 1410; either in addition to, or in lieu of AI-assisted annotation 1310 included in training pipeline(s) 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility(ies) 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner. In at least one embodiment, communications sent to, or received by, a training system 1304 and a deployment system 1306 may occur using a pair of DICOM adapters 1402A, 1402B.

In at least one embodiment, deployment system 1306 may execute deployment pipeline(s) 1410. In at least one embodiment, deployment pipeline(s) 1410 may include any number of applications that may be sequentially, non-sequentially, or otherwise applied to imaging data (and/or other data types) generated by imaging devices, sequencing devices, genomics devices, etc. —including AI-assisted annotation, as described above. In at least one embodiment, as described herein, a deployment pipeline(s) 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline(s) 1410 depending on information desired from data generated by a device. In at least one embodiment, where detections of anomalies are desired from an MRI machine, there may be a first deployment pipeline(s) 1410, and where image enhancement is desired from output of an MRI machine, there may be a second deployment pipeline(s) 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipeline(s) 1410 may be even more user friendly, provide for easier integration, and produce more accurate, efficient, and timely results.

In at least one embodiment, deployment system 1306 may include a user interface 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, user interface 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to services 1320, and/or from application or service to hardware 1322. In at least one embodiment, although illustrated as included in software 1318, this is not intended to be limiting, and in some examples, pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute service(s) 1416, AI service(s) 1418, visualization service(s) 1420, and/or other service types. In at least one embodiment, applications may call (e.g., execute) one or more of services 1320 to perform processing operations for an application. In at least one embodiment, compute service(s) 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs/Graphics 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI service(s) 1418 may be leveraged to perform inferencing services for executing machine learning model(s) associated with applications (e.g., tasked with performing one or more processing tasks of an application). In at least one embodiment, AI service(s) 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output model(s) 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI service(s) 1418.

In at least one embodiment, shared storage may be mounted to AI service(s) 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization service(s) 1420 may be leveraged to generate visualizations for viewing outputs of applications and/or deployment pipeline(s) 1410. In at least one embodiment, GPUs/Graphics 1422 may be leveraged by visualization service(s) 1420 to generate visualizations. In at least one embodiment, rendering effects, such as ray-tracing, may be implemented by visualization service(s) 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization service(s) 1420 may include an internal visualizer, cinematics, and/or other rendering or image processing capabilities or functionality (e.g., ray tracing, rasterization, internal optics, etc.).

In at least one embodiment, hardware 1322 may include GPUs/Graphics 1422, AI system 1424, cloud 1426, and/or any other hardware used for executing training system 1304 and/or deployment system 1306. In at least one embodiment, GPUs/Graphics 1422 (e.g., NVIDIA's TESLA and/or QUADRO GPUs) may include any number of GPUs that may be used for executing processing tasks of compute service(s) 1416, AI service(s) 1418, visualization service(s) 1420, other services, and/or any of features or functionality of software 1318. For example, with respect to AI service(s) 1418, GPUs/Graphics 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1500 may use GPUs/Graphics 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI system 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs/ Graphics 1422, in addition to CPUs, RAM, storage, and/or other components, features, or functionality. In at least one embodiment, one or more AI system 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute service(s) 1416, AI service(s) 1418, and/or visualization service(s) 1420, as described herein. In at least one embodiment, cloud 1426 may perform small and large batch inference (e.g., executing NVIDIA's TENSOR RT), provide a parallel computing platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

Figure 15A:
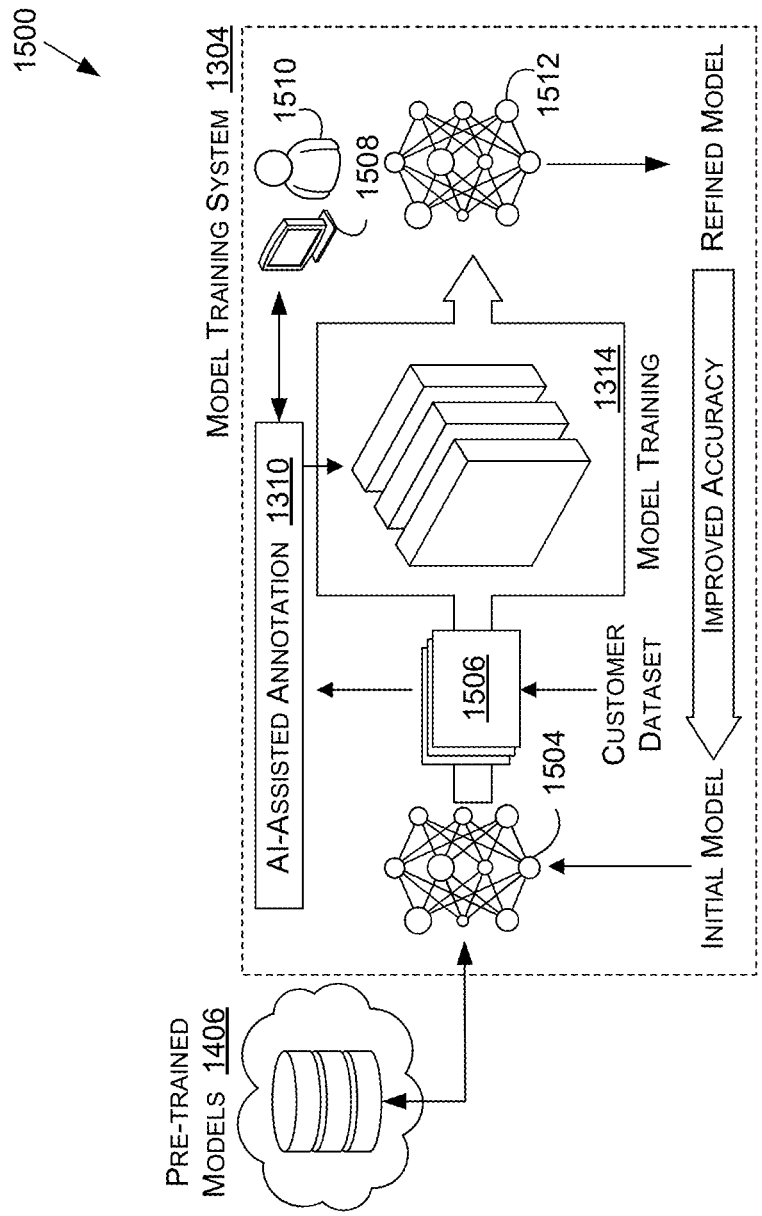

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services and/or hardware as described herein. In at least one embodiment, refined model 1512 generated by process 1500 may be executed by deployment system 1306 for one or more containerized applications in deployment pipelines 1510.

In at least one embodiment, model training 1514 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, deleted, and/or replaced with an updated or new output or loss layer(s). In at least one embodiment, initial model 1504 may have previously fine-tuned parameters (e.g., weights and/or biases) that remain from prior training, so training or retraining may not take as long or require as much processing as training a model from scratch. In at least one embodiment, during model training 1514, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained models 1506 may be stored in a data store, or registry. In at least one embodiment, pre-trained models 1506 may have been trained, at least in part, at one or more facilities other than a facility executing process 1500. In at least one embodiment, to protect privacy and rights of patients, subjects, or clients of different facilities, pre-trained models 1506 may have been trained, on-premise, using customer or patient data generated on-premise. In at least one embodiment, pre-trained models 1506 may be trained using cloud and/or other hardware, but confidential, privacy protected patient data may not be transferred to, used by, or accessible to any components of cloud (or other off premise hardware). In at least one embodiment, where pre-trained models 1506 is trained at using patient data from more than one facility, pre-trained models 1506 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained models 1506 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select pre-trained models 1506 to use with an application. In at least one embodiment, pre-trained models 1506 may not be optimized for generating accurate results on customer dataset 1506 of a facility of a user (e.g., based on patient diversity, demographics, types of medical imaging devices used, etc.). In at least one embodiment, prior to deploying a pre-trained model into a deployment pipeline for use with an application(s), pre-trained models 1506 may be updated, retrained, and/or fine-tuned for use at a respective facility.

In at least one embodiment, a user may select pre-trained models 1506 that is to be updated, retrained, and/or fine-tuned, and a pre-trained model may be referred to as initial model 1504 for training system 1304 within process 1500. In at least one embodiment, customer dataset 1506 (e.g., imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility.

In at least one embodiment, AI-assisted annotation 1310 may be used in some examples to generate ground truth data. In at least one embodiment, AI-assisted annotation 1310 (e.g., implemented using an AI-assisted annotation SDK) may leverage machine learning models (e.g., neural networks) to generate suggested or predicted ground truth data for a customer dataset. In at least one embodiment, user 1510 may use annotation tools within a user interface (a graphical user interface (GUI)) on computing device 1508.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training to generate refined model

1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical imaging data.

In at least one embodiment, refined model 1512 may be uploaded to pre-trained models 1406 in model registry to be selected by another facility. In at least one embodiment, this process may be completed at any number of facilities such that refined model 1512 may be further refined on new datasets any number of times to generate a more universal model.

FIG. 15B is an example illustration of a client-server architecture 1532 to enhance annotation tools with pre-trained models 1542, in accordance with at least one embodiment. In at least one embodiment, AI-assisted annotation tool 1536 may be instantiated based on a client-server architecture 1532. In at least one embodiment, AI-assisted annotation tool 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation 1310, a deep learning model, for example, may receive this data as input and return inference results of a segmented organ or abnormality. In at least one embodiment, pre-instantiated annotation tools, such as AI-assisted annotation tool 1536 in FIG. 15B, may be enhanced by making API calls (e.g., API Call 1544) to a server, such as an annotation assistant server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines 1504. In at least one embodiment, pre-installed annotation tools may be improved over time as new labeled data 1412 is added.

Such components can be used to train a generative model, such as a score-based generative model, to generate or synthesize content.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
    providing an input image to a generative neural network, the input image including a first representation of an object;
    determining a set of velocity values coupled to a set of pixel values of the input image;
    introducing noise values to the set of velocity values for the image to obtain a noise image, the noise values being introduced iteratively during a forward diffusion process;
    removing one or more of the noise values from the noise image to obtain a reconstructed image including a second representation of the object, the noise values being removed iteratively during a reverse denoising diffusion process; and
    adjusting network parameters for the generative neural network based at least on one or more differences between at least the input image and the reconstructed image.

2. The computer-implemented method of claim 1, further comprising:
   determining the one or more noise values to remove from the noise image according to a score function learned during the forward diffusion process.
3. The computer-implemented method of claim 2, further comprising:
   determining the one or more noise values to remove according to a stochastic differential equation including a term corresponding to the score function for the set of velocity values.
4. The computer-implemented method of claim 3, further comprising:
   determining the one or more noise values to remove using a numerical solver to simulate the stochastic differential equation.
5. The computer-implemented method of claim 3, further comprising:
   performing hybrid score matching (HSM) to determine the score function, the hybrid score matching including diffusion score matching and denoising score matching.
6. The computer-implemented method of claim 1, further comprising:
   mapping one or more pixel values of the input image to a multi-dimensional space including both the one or more pixel values and one or more velocity values of the set of velocity values corresponding to the input image.
7. The computer-implemented method of claim 1, further comprising:
   introducing the noise values at least by perturbing the input image during the forward diffusion process into a tractable distribution.
8. The computer-implemented method of claim 1, further comprising:
   learning a score function of a conditional distribution of the set of velocity values during the forward diffusion process using critically-damped Langevin diffusion.
9. The computer-implemented method of claim 1, wherein the set of velocity values is coupled to the set of pixel values using Hamiltonian dynamics.
10. The computer-implemented method of claim 1, further comprising:
    calculating the set of velocity values as first-order time derivatives of the set of pixel values.
11. A processor, comprising:
    one or more circuits to cause the processor to perform operations comprising:
    providing input to a generative neural network;
    determining a set of auxiliary values corresponding to a set of data values of the input;
    introducing noise values to the set of auxiliary values corresponding to the input to obtain noise data, the one or more noise values being introduced iteratively during a forward diffusion process;
    removing the one or more noise values from the auxiliary values to obtain a reconstructed input, the one or more noise values being removed iteratively during a reverse denoising diffusion process; and
    adjusting network parameters for the generative neural network based at least on differences between at least the input and the reconstructed input.
12. The processor of claim 11, wherein the one or more circuits are to perform operations further comprising:
    determining the one or more noise values to remove from the auxiliary values according to a stochastic differential equation including a term corresponding to a score function for the set of auxiliary values.
13. The processor of claim 12, wherein the one or more circuits are to perform operations further comprising:
    determining the one or more noise values to remove using a numerical solver to simulate the stochastic differential equation.
14. The processor of claim 11, wherein the one or more circuits are to perform operations further comprising:
    mapping one or more data values corresponding to the input to a multi-dimensional space including the one or more data values and one or more auxiliary values of the set of auxiliary values corresponding to the input.
15. The processor of claim 11, wherein the one or more auxiliary values include one or more velocity values, and wherein one or more circuits are to perform operations further comprising:
    Learning a score function of a conditional distribution corresponding to the one or more velocity values during the diffusion process using critically-damped Langevin diffusion.
16. The processor of claim 11, wherein the processor is comprised in at least one of:
    a system for performing simulation operations;
    a system for performing simulation operations to test or validate autonomous machine applications;
    a system for performing digital twin operations;
    a system for performing light transport simulation;
    a system for rendering graphical output;
    a system for performing deep learning operations;
    a system implemented using an edge device;
    a system for generating or presenting virtual reality (VR) content;
    a system for generating or presenting augmented reality (AR) content;
    a system for generating or presenting mixed reality (MR) content;
    a system incorporating one or more Virtual Machines (VMs);
    a system implemented at least partially in a data center;
    a system for performing hardware testing using simulation;
    a system for synthetic data generation;
    a collaborative content creation platform for 3D assets; or
    a system implemented at least partially using cloud computing resources.
17. A system, comprising:
    one or more processing units to train a score-based generative neural network at least by adding noise during a forward diffusion process to a set of velocity variables corresponding to a set of pixel values of an input image, and removing the noise from the set of velocity variables during a reverse diffusion denoising process to generate a reconstruction of the input image.
18. The system of claim 17, wherein the one or more processing units are further to:
    determine noise values corresponding to the noise to remove according to a stochastic differential equation including a term corresponding to a score function for the set of velocity variables.
19. The system of claim 18, wherein the one or more processing units are further to:
    learn the score function of a conditional distribution of the set of velocity variables during the forward diffusion process using critically-damped Langevin diffusion.

20. The system of claim 17, wherein the system comprises at least one of:
- a system for performing simulation operations;
- a system for performing simulation operations to test or validate autonomous machine applications;
- a system for performing digital twin operations;
- a system for performing light transport simulation;
- a system for rendering graphical output;
- a system for performing deep learning operations;
- a system implemented using an edge device;
- a system for generating or presenting virtual reality (VR) content;
- a system for generating or presenting augmented reality (AR) content;
- a system for generating or presenting mixed reality (MR) content;
- a system incorporating one or more Virtual Machines (VMs);
- a system implemented at least partially in a data center;
- a system for performing hardware testing using simulation;
- a system for synthetic data generation;
- a collaborative content creation platform for 3D assets; or
- a system implemented at least partially using cloud computing resources.

* * * * *